US012592790B2

(12) United States Patent
Yang et al.

(10) Patent No.: US 12,592,790 B2
(45) Date of Patent: Mar. 31, 2026

(54) MODULATION BASED HYBRID AUTOMATIC REPEAT REQUEST FEEDBACK RETRANSMISSION DESIGN

(71) Applicant: QUALCOMM Incorporated, San Diego, CA (US)

(72) Inventors: Wei Yang, San Diego, CA (US); Jing Jiang, San Diego, CA (US); Thomas Joseph Richardson, South Orange, NJ (US); Pinar Sen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 551 days.

(21) Appl. No.: 17/951,080

(22) Filed: Sep. 22, 2022

(65) Prior Publication Data

US 2024/0106563 A1    Mar. 28, 2024

(51) Int. Cl.
*H04L 1/00* (2006.01)

(52) U.S. Cl.
CPC .......... *H04L 1/0005* (2013.01); *H04L 1/0006* (2013.01)

(58) Field of Classification Search
CPC combination set(s) only.
See application file for complete search history.

(56) References Cited

U.S. PATENT DOCUMENTS

2002/0199147 A1    12/2002  Kim et al.
2003/0081576 A1*    5/2003  Kim ..................... H04L 1/1893
                                                      370/335
2008/0260067 A1*   10/2008  Wengerter ............ H04L 1/0071
                                                      375/295
2018/0331788 A1    11/2018  Kim et al.
2021/0068004 A1     3/2021  Kadiri et al.

FOREIGN PATENT DOCUMENTS

WO    WO-2020020456 A1    1/2020
WO    WO-2022188015 A1    9/2022

OTHER PUBLICATIONS

International Search Report and Written Opinion—PCT/US2023/072312—ISA/EPO—Mar. 4, 2024 (2205740WO).

(Continued)

*Primary Examiner* — Kouroush Mohebbi
(74) *Attorney, Agent, or Firm* — Holland & Hart LLP

(57) ABSTRACT

Methods, systems, and devices for wireless communication are described. For example, the described techniques provide for a wireless device transmitting an initial transmission associated with a data payload, such as a hybrid automatic repeat request (HARQ) payload. The initial transmission may include a set of bits modulated using a first bit ordering scheme, and the set of bits may include a first bit subset that are transmitted with a lower transmission reliability than a second bit subset of the set of bits. The wireless device may modulate the first bit subset using a second bit ordering scheme that differs from the first bit ordering scheme to generate a modulated bit set. The second bit ordering scheme may be associated with a higher transmission reliability for the first bit subset. The wireless device may transmit the second transmission for the data payload with the modulated bit set.

25 Claims, 17 Drawing Sheets

(56)              References Cited

OTHER PUBLICATIONS

Chu J.T., et al., "Inequalities Between Information Measures and Error Probability", Journal of the Franklin Institute, Brief Communications, vol. 282, No. 2, Aug. 1, 1966, pp. 121-125, XP093103658, ISSN: 0016-0032, DOI: 10.1016/0016-0032(66)90359-0.

Ho S-W., et al., "Conditional Entropy and Error Probability", ISIT 2008, IEEE International Symposium on, IEEE, Piscataway, NJ, USA, Information Theory, 2008, Jul. 6, 2008, pp. 1622-1626, XP031303184, ISBN: 978-1-4244-2256-2.

Partial International Search Report—PCT/US2023/072312—ISA/EPO—Dec. 8, 2023 (2205740WO).

* cited by examiner 130     105     115

Network
Entity

Transceiver

1410

Antenna

1415

Communications
Manager

1420

Memory

Code

1430

1425

1440

Processor

1435

1405

1400

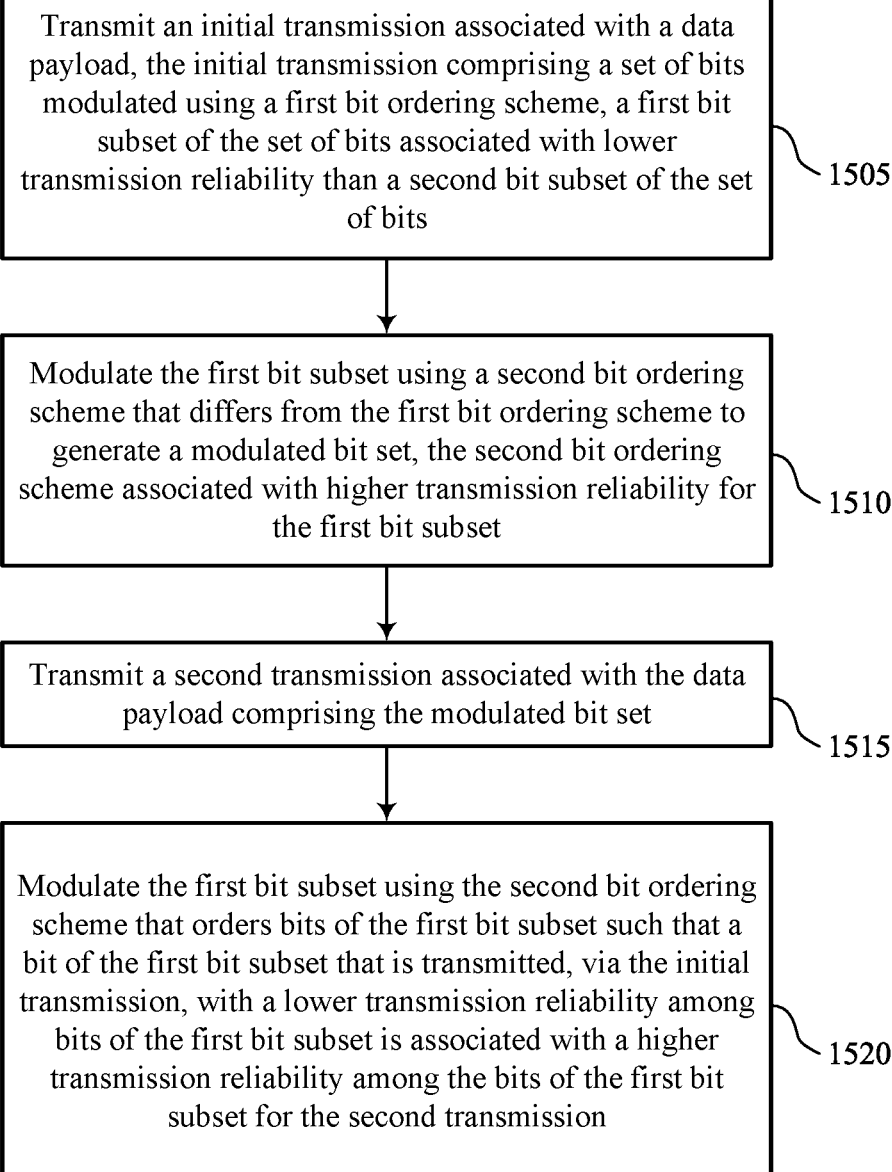

Transmit an initial transmission associated with a data payload, the initial transmission comprising a set of bits modulated using a first bit ordering scheme, a first subset of the set of bits associated with lower transmission reliability than a second bit subset of the set of bits ⟍ 1505

Modulate the first bit subset using a second bit ordering scheme that differs from the first bit ordering scheme to generate a modulated bit set, the second bit ordering scheme associated with higher transmission reliability for the first bit subset ⟍ 1510

Transmit a second transmission associated with the data payload comprising the modulated bit set ⟍ 1515

Modulate the first bit subset using the second bit ordering scheme that orders bits of the first bit subset such that a bit of the first bit subset that is transmitted, via the initial transmission, with a lower transmission reliability among bits of the first bit subset is associated with a higher transmission reliability among the bits of the first bit subset for the second transmission ⟍ 1520

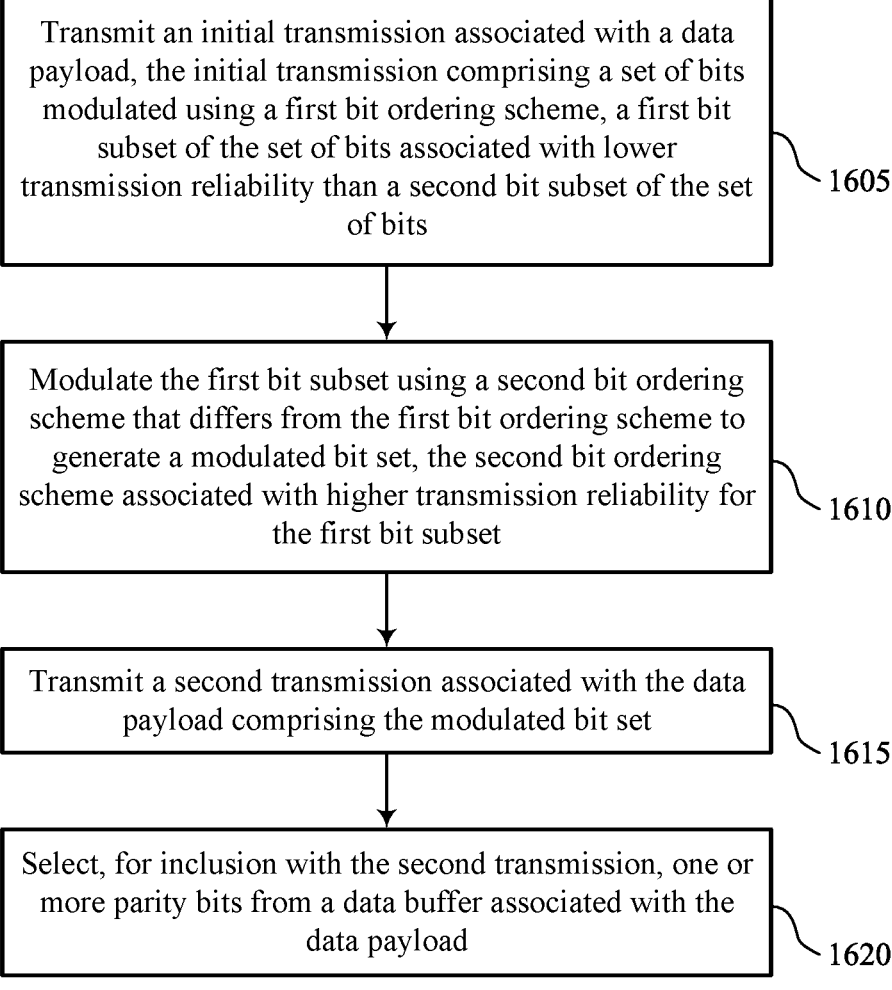

Transmit an initial transmission associated with a data payload, the initial transmission comprising a set of bits modulated using a first bit ordering scheme, a first bit subset of the set of bits associated with lower transmission reliability than a second bit subset of the set of bits

1605

Modulate the first bit subset using a second bit ordering scheme that differs from the first bit ordering scheme to generate a modulated bit set, the second bit ordering scheme associated with higher transmission reliability for the first bit subset

1610

Transmit a second transmission associated with the data payload comprising the modulated bit set

1615

Select, for inclusion with the second transmission, one or more parity bits from a data buffer associated with the data payload

Figure 17:
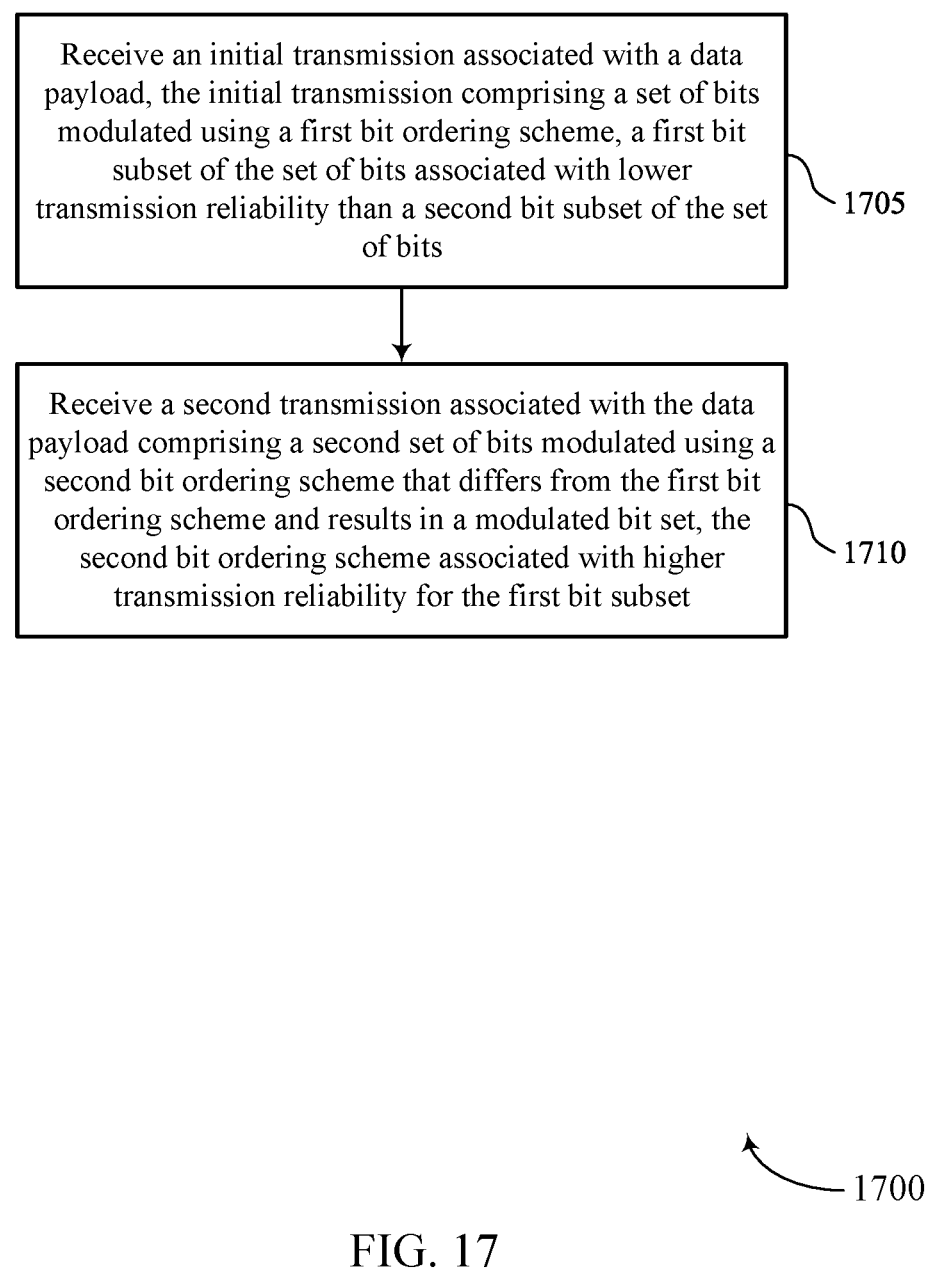

Receive an initial transmission associated with a data payload, the initial transmission comprising a set of bits modulated using a first bit ordering scheme, a first bit subset of the set of bits associated with lower transmission reliability than a second bit subset of the set of bits

1705

Receive a second transmission associated with the data payload comprising a second set of bits modulated using a second bit ordering scheme that differs from the first bit ordering scheme and results in a modulated bit set, the second bit ordering scheme associated with higher transmission reliability for the first bit subset

MODULATION BASED HYBRID AUTOMATIC REPEAT REQUEST FEEDBACK RETRANSMISSION DESIGN

TECHNICAL FIELD

The following relates to wireless communication, including modulation based hybrid automatic repeat request (HARQ) feedback retransmission design.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless systems, a wireless device may transmit a hybrid automatic repeat request (HARQ) feedback associated with a data communication. For example, in response to receiving data from a network entity, a UE may transmit a HARQ acknowledgment (HARQ-ACK) feedback indicating successful reception of the data, or may transmit a HARQ negative acknowledgment (HARQ-NACK) feedback indicating successful reception of the data. A HARQ transmission and a HARQ retransmission may include one or more parity bits such that a receiver may receive the transmission and the retransmission and combine the transmission and retransmission to decode the HARQ payload.

SUMMARY

The described techniques relate to improved methods, systems, devices, and apparatuses that support modulation based hybrid automatic repeat request (HARQ) feedback retransmission design. For example, the described techniques provide for a wireless device transmitting an initial transmission associated with a data payload, such as a HARQ payload. The initial transmission may include a set of bits modulated using a first bit ordering scheme, and the set of bits may include a first bit subset that are transmitted with a lower transmission reliability than a second bit subset of the set of bits. The lower transmission reliability may be based on a conditional entropy of the bits as modulated to symbols. The wireless device may modulate the first bit subset using a second bit ordering scheme that differs from the first bit ordering scheme to generate a modulated bit set. The second bit ordering scheme may be associated with a higher transmission reliability for the first bit subset. The wireless device may transmit the second transmission for the data payload with the modulated bit set.

A method for wireless communication at wireless device is described. The method may include transmitting an initial transmission associated with a data payload, the initial transmission including a set of bits modulated using a first bit ordering scheme, a first bit subset of the set of bits associated with lower transmission reliability than a second bit subset of the set of bits, modulating the first bit subset using a second bit ordering scheme that differs from the first bit ordering scheme to generate a modulated bit set, the second bit ordering scheme associated with higher transmission reliability for the first bit subset, and transmitting a second transmission associated with the data payload including the modulated bit set.

An apparatus for wireless communication at wireless device is described. The apparatus may include a processor, memory coupled with the processor, and instructions stored in the memory. The instructions may be executable by the processor to cause the apparatus to transmit an initial transmission associated with a data payload, the initial transmission including a set of bits modulated using a first bit ordering scheme, a first bit subset of the set of bits associated with lower transmission reliability than a second bit subset of the set of bits, modulate the first bit subset using a second bit ordering scheme that differs from the first bit ordering scheme to generate a modulated bit set, the second bit ordering scheme associated with higher transmission reliability for the first bit subset, and transmit a second transmission associated with the data payload including the modulated bit set.

Another apparatus for wireless communication at wireless device is described. The apparatus may include means for transmitting an initial transmission associated with a data payload, the initial transmission including a set of bits modulated using a first bit ordering scheme, a first bit subset of the set of bits associated with lower transmission reliability than a second bit subset of the set of bits, means for modulating the first bit subset using a second bit ordering scheme that differs from the first bit ordering scheme to generate a modulated bit set, the second bit ordering scheme associated with higher transmission reliability for the first bit subset, and means for transmitting a second transmission associated with the data payload including the modulated bit set.

A non-transitory computer-readable medium storing code for wireless communication at wireless device is described. The code may include instructions executable by a processor to transmit an initial transmission associated with a data payload, the initial transmission including a set of bits modulated using a first bit ordering scheme, a first bit subset of the set of bits associated with lower transmission reliability than a second bit subset of the set of bits, modulate the first bit subset using a second bit ordering scheme that differs from the first bit ordering scheme to generate a modulated bit set, the second bit ordering scheme associated with higher transmission reliability for the first bit subset, and transmit a second transmission associated with the data payload including the modulated bit set.

In some examples of the method, apparatuses, and non-transitory computer-readable medium described herein, modulating the first bit subset using the second bit ordering scheme may include operations, features, means, or instructions for modulating the first bit subset using the second bit ordering scheme that orders bits of the first bit subset such that a bit of the first bit subset that may be transmitted, via the initial transmission, with a lower transmission reliability among bits of the first bit subset may be associated with a higher transmission reliability among the bits of the first bit subset for the second transmission.

In some examples of the method, apparatuses, and non-transitory computer-readable medium described herein, modulating the first bit subset using the second bit ordering scheme may include operations, features, means, or instructions for modulating the first bit subset using the second bit ordering scheme that reverses a bit ordering that was used for the initial transmission of the first bit subset.

In some examples of the method, apparatuses, and non-transitory computer-readable medium described herein, the set of bits of the initial transmission may be modulated using a first modulation order and the modulated bit set of the second transmission may be modulated using a second modulation order, where the second modulation order may be a lower modulation order than the first modulation order.

In some examples of the method, apparatuses, and non-transitory computer-readable medium described herein, modulating the first bit subset using the second bit ordering scheme may include operations, features, means, or instructions for determining a conditional entropy corresponding to a modulation order used for modulating the set of bits for the initial transmission, selecting the first bit subset for the second transmission based on the first bit subset having a higher conditional entropy than the second bit subset, and modulating the selected first bit subset using the second bit ordering scheme.

Some examples of the method, apparatuses, and non-transitory computer-readable medium described herein may further include operations, features, means, or instructions for flipping a bit value for each bit of a subset of bits of the first bit subset and mapping the first bit subset that includes the flipped bit value to a modulation order to generate the modulated bit set.

In some examples of the method, apparatuses, and non-transitory computer-readable medium described herein, the set of bits of the initial transmission and the first bit subset of the second transmission may be scrambled using a same scrambling identifier.

Some examples of the method, apparatuses, and non-transitory computer-readable medium described herein may further include operations, features, means, or instructions for selecting, for inclusion with the second transmission, one or more parity bits from a data buffer associated with the data payload.

In some examples of the method, apparatuses, and non-transitory computer-readable medium described herein, the second bit ordering scheme prioritizes the one or more parity bits such that the one or more parity bits may be associated with a higher transmission reliability than the first bit subset.

In some examples of the method, apparatuses, and non-transitory computer-readable medium described herein, the second bit ordering scheme reverses an order of bits of the first bit subset.

In some examples of the method, apparatuses, and non-transitory computer-readable medium described herein, selecting the one or more parity bits may include operations, features, means, or instructions for selecting the one or more parity bits until a coding rate threshold may be satisfied for the second transmission.

In some examples of the method, apparatuses, and non-transitory computer-readable medium described herein, the set of bits of the initial transmission may be modulated using a probabilistic shaping modulation, the first bit subset being associated with lower transmission reliability than a second bit subset of the set of bits based on the probabilistic shaping modulation.

In some examples of the method, apparatuses, and non-transitory computer-readable medium described herein, the second bit ordering scheme prioritizes the first bit subset based on transmission reliabilities of bit positions for the probabilistic shaping modulation.

Some examples of the method, apparatuses, and non-transitory computer-readable medium described herein may further include operations, features, means, or instructions for communicating control signaling that indicates the first bit ordering scheme, the second bit ordering scheme, or both.

A method for wireless communication at a wireless device is described. The method may include receiving an initial transmission associated with a data payload, the initial transmission including a set of bits modulated using a first bit ordering scheme, a first bit subset of the set of bits associated with lower transmission reliability than a second bit subset of the set of bits and receiving a second transmission associated with the data payload including a second set of bits modulated using a second bit ordering scheme that differs from the first bit ordering scheme and results in a modulated bit set, the second bit ordering scheme associated with higher transmission reliability for the first bit subset.

An apparatus for wireless communication at a wireless device is described. The apparatus may include a processor, memory coupled with the processor, and instructions stored in the memory. The instructions may be executable by the processor to cause the apparatus to receive an initial transmission associated with a data payload, the initial transmission including a set of bits modulated using a first bit ordering scheme, a first bit subset of the set of bits associated with lower transmission reliability than a second bit subset of the set of bits and receive a second transmission associated with the data payload including a second set of bits modulated using a second bit ordering scheme that differs from the first bit ordering scheme and results in a modulated bit set, the second bit ordering scheme associated with higher transmission reliability for the first bit subset.

Another apparatus for wireless communication at a wireless device is described. The apparatus may include means for receiving an initial transmission associated with a data payload, the initial transmission including a set of bits modulated using a first bit ordering scheme, a first bit subset of the set of bits associated with lower transmission reliability than a second bit subset of the set of bits and means for receiving a second transmission associated with the data payload including a second set of bits modulated using a second bit ordering scheme that differs from the first bit ordering scheme and results in a modulated bit set, the second bit ordering scheme associated with higher transmission reliability for the first bit subset.

A non-transitory computer-readable medium storing code for wireless communication at a wireless device is described. The code may include instructions executable by a processor to receive an initial transmission associated with a data payload, the initial transmission including a set of bits modulated using a first bit ordering scheme, a first bit subset of the set of bits associated with lower transmission reliability than a second bit subset of the set of bits and receive a second transmission associated with the data payload including a second set of bits modulated using a second bit ordering scheme that differs from the first bit ordering scheme and results in a modulated bit set, the second bit ordering scheme associated with higher transmission reliability for the first bit subset.

In some examples of the method, apparatuses, and non-transitory computer-readable medium described herein, the second bit ordering scheme orders bits of the first bit subset such that a bit of the first bit subset that may be received, via the initial transmission, with a lower transmission reliability among bits of the first bit subset may be associated with a higher transmission reliability among the bits of the first bit subset for the second transmission.

In some examples of the method, apparatuses, and non-transitory computer-readable medium described herein, the second bit ordering scheme reverses a bit ordering that was used for the initial transmission of the first bit subset.

In some examples of the method, apparatuses, and non-transitory computer-readable medium described herein, the set of bits of the initial transmission may be modulated using a first modulation order and the second set of bits of the second transmission may be modulated using a second modulation order, where the second modulation order may be a lower modulation order than the first modulation order.

In some examples of the method, apparatuses, and non-transitory computer-readable medium described herein, the first bit subset includes a flipped bit value for each bit of a subset of bits of the first bit subset.

In some examples of the method, apparatuses, and non-transitory computer-readable medium described herein, the set of bits of the initial transmission and the first bit subset of the second transmission may be scrambled using a same scrambling identifier.

In some examples of the method, apparatuses, and non-transitory computer-readable medium described herein, the second transmission includes one or more parity bits.

In some examples of the method, apparatuses, and non-transitory computer-readable medium described herein, the second bit ordering scheme prioritizes the one or more parity bits such that the one or more parity bits may be associated with a higher transmission reliability than the first bit subset.

In some examples of the method, apparatuses, and non-transitory computer-readable medium described herein, the second bit ordering scheme reverses an order of bits of the first bit subset.

In some examples of the method, apparatuses, and non-transitory computer-readable medium described herein, the set of bits of the initial transmission may be modulated using a probabilistic shaping modulation, the first bit subset being associated with lower transmission reliability than a second bit subset of the set of bits based on the probabilistic shaping modulation.

In some examples of the method, apparatuses, and non-transitory computer-readable medium described herein, the second bit ordering scheme prioritizes the first bit subset based on transmission reliabilities of bit positions for the probabilistic shaping modulation.

Some examples of the method, apparatuses, and non-transitory computer-readable medium described herein may further include operations, features, means, or instructions for communicating control signaling that indicates the first bit ordering scheme, the second bit ordering scheme, or both.

BRIEF DESCRIPTION OF THE DRAWINGS

FIGS. 15 through 17 show flowcharts illustrating methods that support modulation based HARQ feedback retransmission design in accordance with one or more aspects of the present disclosure.

DETAILED DESCRIPTION

Figure 1:
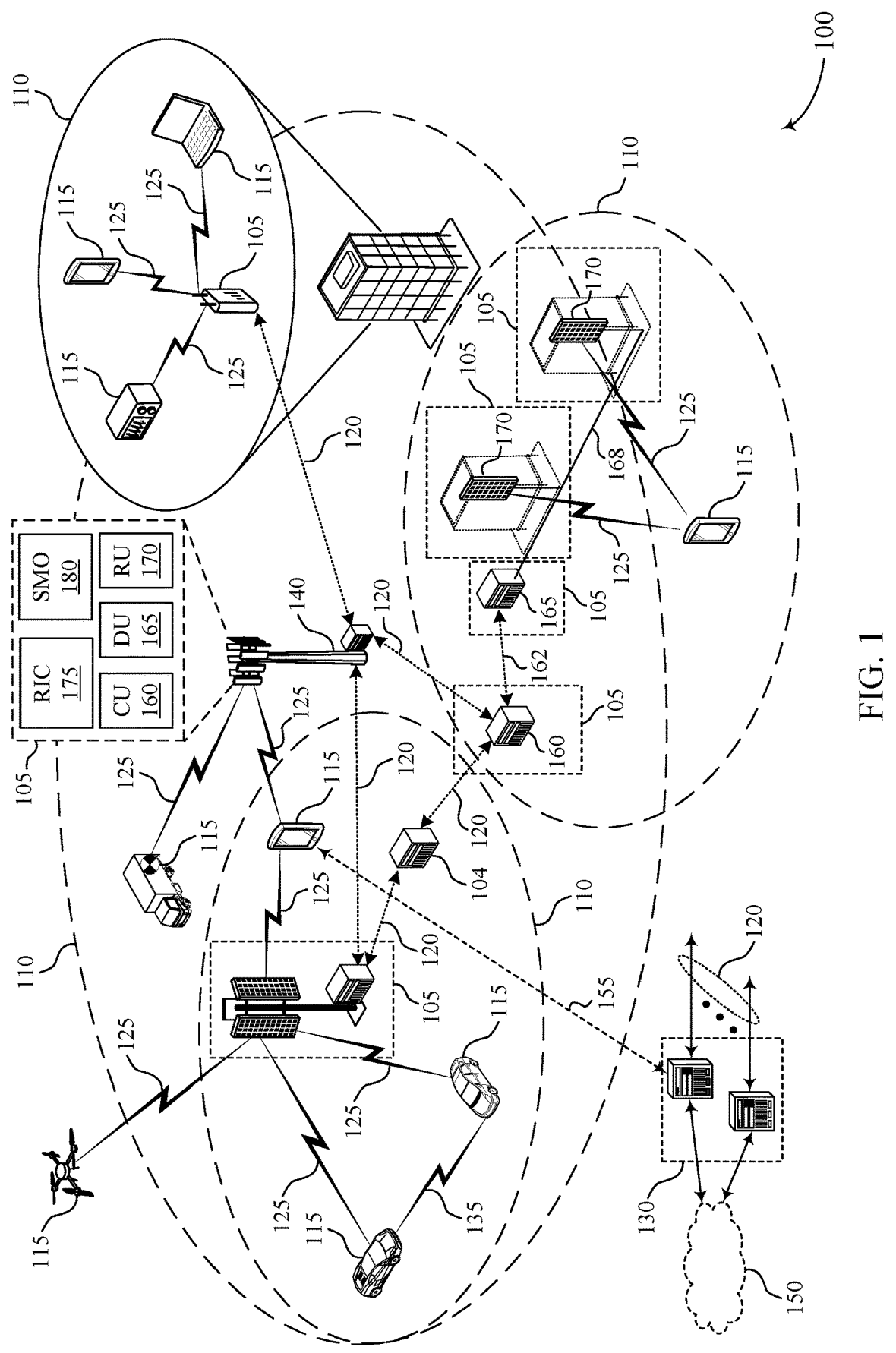
FIG. 1 illustrates an example of a wireless communications system that supports modulation based hybrid automatic repeat request (HARQ) feedback retransmission design in accordance with one or more aspects of the present disclosure.

In some wireless systems, a wireless device may transmit a hybrid automatic repeat request (HARQ) feedback associated with a data communication. For example, in response to receiving data from a network entity, a user equipment (UE) may transmit a HARQ acknowledgment (HARQ-ACK) feedback indicating successful reception of the data, or may transmit a HARQ negative acknowledgment (HARQ-NACK) feedback indicating successful reception of the data. A HARQ transmission and a HARQ retransmission may include one or more parity bits such that a receiver may receive the transmission and the retransmission and combine the transmission and retransmission to decode the HARQ payload. The parity bits may be the same or different for the transmission or retransmission, depending on the implemented coding technique.

In some cases, usage of parity bits for transmission and retransmission may incur greater memory costs, power consumption, or latency at a transmitting and receiving device, as the devices may store bits of prior transmissions in a HARQ buffers for subsequent encoding and combining. As throughput of data communications increases, a quantity of bits stored by the devices (e.g., in the one or more HARQ buffers) may increase, thereby reducing available memory at the devices, and increasing computational complexity at the devices.

To support mitigation of resource usage and computational complexity, a device (e.g., a UE or network entity) may utilize a modulation based HARQ retransmission configuration. In some cases, the modulation based HARQ retransmission configuration may support identifying a transmission reliability (e.g., a likelihood that the bit was successfully received) of each bit of a set of coded bits from an initial HARQ transmission and selecting a subset of the bits having the lowest reliabilities in the initial transmission for a retransmission. The device may modulate the set of bits such that the subset of bits may have an increased transmission reliability (relative to the initial transmission) for the retransmission (e.g., a reverse ordering). For example, the device may map the bits for a HARQ retransmission such the subset of bits having the lowest reliabilities (e.g., mapped to least significant bit (LSB) locations in the initial transmission) are mapped to the most significant bits (MSB) for the retransmission. In some examples, the device may first flip values for a subset of the bits for the retransmission before performing the bit reversal, thus modifying (e.g., increasing) the modulation power for the low-reliability bits. Additionally, to support communications via a wireless channel with a relatively high coding rate, the UE may prioritize parity bits from the HARQ buffer over bits from the initial transmission for the retransmission.

Aspects of the disclosure are initially described in the context of wireless communications systems. Aspects of the disclosure are further illustrated by and described with reference to buffer diagrams, bit ordering schemes, and process flows. Aspects of the disclosure are further illustrated by and described with reference to apparatus diagrams, system diagrams, and flowcharts that relate to modulation based HARQ feedback retransmission design.

FIG. 1 illustrates an example of a wireless communications system 100 that supports modulation based HARQ feedback retransmission design in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies, not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, or computing system may include disclosure of the UE 115, network entity 105, apparatus, device, or computing system being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support modulation based HARQ feedback retransmission design as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of the wireless communications system 100, a wireless transmitter (e.g., a UE 115) may transmit, via a wireless channel, a HARQ transmission and a HARQ retransmission according to a coding rate of the wireless channel. For example, a UE 115 may employ a type of HARQ design which supports rate-compatible channel codes, such as turbo code or low-density parity check (LDPC) codes. That is, a HARQ transmission may include one or more parity bits such that a coding rate (e.g., a ratio between a quantity of relevant information bits and a quantity of total received bits) for the HARQ transmission is compatible with a coding rate for a wireless channel for the HARQ transmission. In some examples, retransmissions of the HARQ feedback (e.g., subsequent HARQ transmissions corresponding to retransmissions of an associated data payload) may include a same set of information and parity bits, such as in a chase-combining HARQ (CC-HARQ) configuration. In some other examples, retransmissions of the HARQ feedback may include different sets of parity bits for a same set of information bits, such as in an incremental redundancy HARQ (IR-HARQ), which may provide a relatively higher performance, coding gain, or both for HARQ communications (e.g., in comparison to CC-HARQ).

In some cases, usage of an IR-HARQ design may incur greater memory costs, power consumption, latency, or any combination thereof at a receiving device. For example, in order to communicate HARQ feedback according to an IR-HARQ configuration, the UE 115 may store one or more set of bits in one or more configured data buffers (e.g., HARQ buffers). The UE 115 may maintain a first HARQ buffer including encoded bits corresponding to received data transmissions and may maintain a second HARQ buffer including a log-likelihood ratio (LLR) for each encoded bit (e.g., bits stored in the first HARQ buffer). In some examples, the UE 115 may continue to store encoded bits and corresponding LLRs for subsequent data receptions. Thus, a throughput of data communications may be associated with (e.g., proportional to) a memory cost for UE 115 to maintain the HARQ buffers.

Additionally, or alternatively, the UE 115 may combine HARQ bits for a current transmission with HARQ bits for one or more previous transmissions, which may reduce the effective coding rate of the HARQ transmission (e.g., due to an increased quantity of parity bits for a same quantity of information bits). In some such examples (e.g., when the UE 115 utilizes an LDPC code), the UE 115 may decode a retransmission of a transport block according to the reduced effective coding rate. In some cases, decoding data according to the reduced effective coding rate may increase a decoding complexity for the data (e.g., compared to decoding the data according to a higher coding rate), which may increase power consumption, latency, or both related to the HARQ transmission (e.g., retransmission).

In some examples, such as when the UE 115 operates according to a stringent throughput threshold (e.g., 1 Tbps), the adverse effects associated with the usage of an IR-HARQ design (e.g., memory cost, power cost, latency) may result in significant degradation of communications. Thus, a HARQ design which operates independent of a channel coding rate may support an increased data throughput.

In some techniques as discussed herein, a device (e.g., a UE 115 or network entity 105) may utilize a modulation based HARQ retransmission configuration. In some cases, the modulation based HARQ retransmission configuration may support identifying a transmission reliability (e.g., a likelihood that the bit was successfully received) of each bit of a set of coded bits from an initial HARQ transmission and selecting a subset of the bits having the lowest reliabilities in the initial transmission for a retransmission. The device may modulate the set of bits such that the subset of bits may have an increased transmission reliability (relative to the initial transmission) for the retransmission (e.g., a reverse ordering). Additionally, to support communications via a wireless channel with a relatively high coding rate, the UE may prioritize parity bits from the HARQ buffer over bits from the initial transmission for the retransmission.

Figure 2:
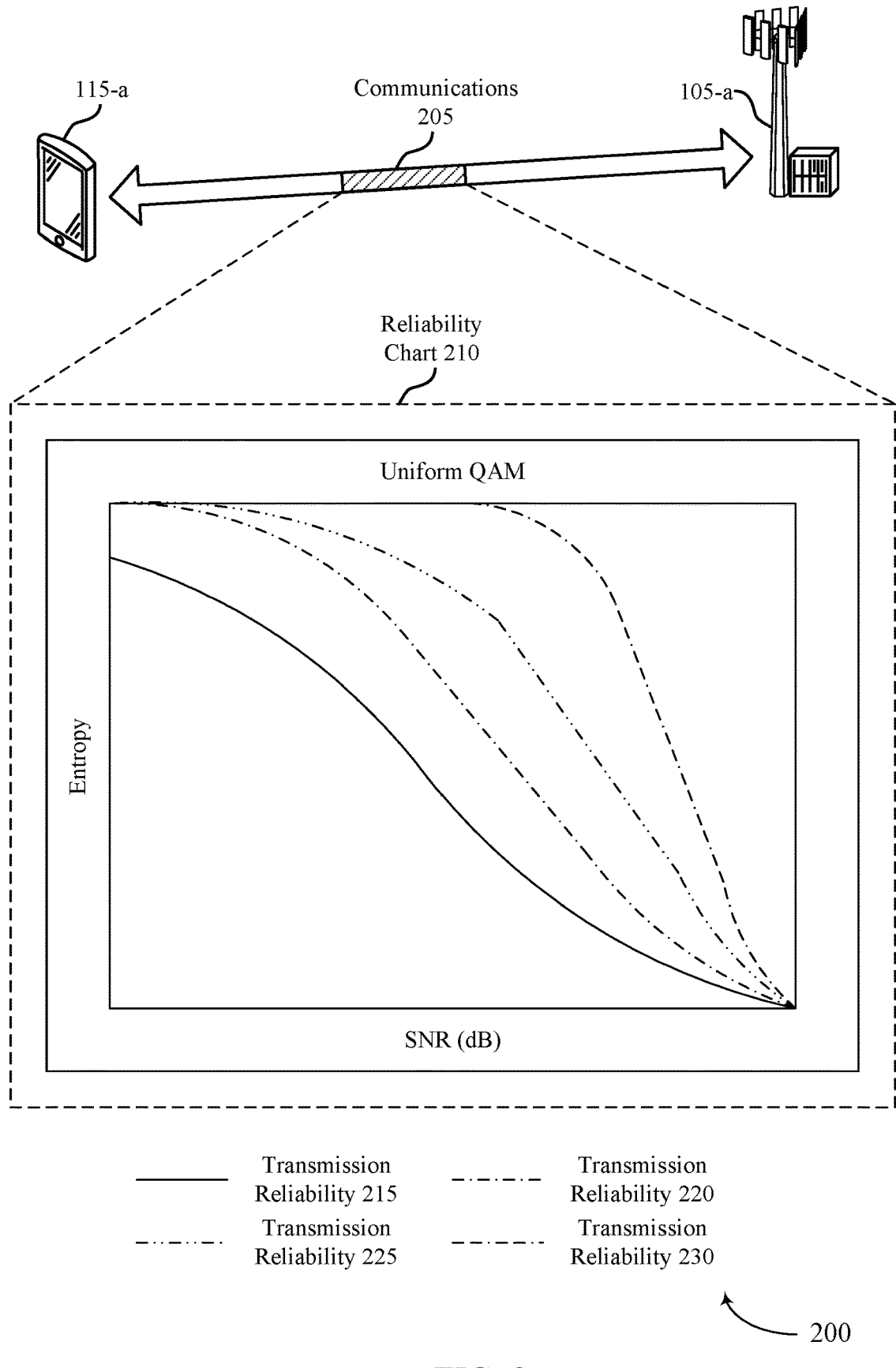
FIG. 2 illustrates an example of a wireless communications system that supports modulation based HARQ feedback retransmission design in accordance with one or more aspects of the present disclosure.

FIG. 2 illustrates an example of a wireless communications system 200 that supports modulation based HARQ feedback retransmission design in accordance with one or more aspects of the present disclosure. In some examples, the wireless communications system 200 may include one or more aspects of the wireless communications system 100. For example, the wireless communications system 200 may include a UE 115-*a* and a network entity 105-*a*, which may be respective examples of a UE 115 and a network entity 105 as described with reference to FIG. 1. The wireless communications system 200 may be an example of communications 205 between the UE 115-*a* and the network entity 105-*a* (e.g., via an uplink communication link, a downlink communication link, or both). While performing the communications 205, a transmitting device (e.g., the UE 115-*a* or the network entity 105-*a*) may transmit a set of bits which correspond to a data payload (e.g., a HARQ payload).

In some examples of the wireless communications system 200, such as when communications 205 are performed according to a coding based HARQ design, a transmitting device (e.g., the network entity 105-*a*) may encode a transmit block (TB) to be transmitted to a receiving device (e.g., the UE 115-*a*). The transmitting device may generate a quantity of coded bits corresponding to a size of the TB (e.g., size K) and a coding rate for the transmission. For example, the transmitting device may generate 3K bits for a coding rate of 1/3 (e.g., 1 information bit for every 3 coded bits, a base graph 1 (BG1) rate), 5K bits for a coding rate of 1/5 (e.g., 1 information bit for every 5 coded bits, a base graph 2 (BG2) rate), and so on. In some examples, the transmitting device may store the coded bits in a circular buffer, and may select a subset of bits from the circular buffer for one or more HARQ communications (e.g., transmissions and retransmissions). The transmitting device may select the subset of bits based on an instantaneous coding rate of the transmission (e.g., a relatively higher coding rate), a redundancy version for the buffer (e.g., indicating a start of the subset of bits), or both.

In some such examples, the receiving device (e.g., a UE 115-*a*) may maintain a circular buffer similar to that of the transmitting device to support communications 205. For example, the receiving device may store, in the circular buffer, a set of LLRs corresponding to each encoded bit of a received TB. In some cases, an LLR of the set of LLRs may include multiple bits, and thus a quantity of bits stored in the buffer for a received TB may be associated with a size of an LLR (e.g., X bits), a coding rate (e.g., a BG1 rate to support relatively large TB sizes), a maximum TB size for a network, or any combination thereof. As such, the transmitting device and the receiving device may experience significant memory usage for an increased throughput (e.g., memory usage doubling responsive to doubling a supported throughput).

Additionally, a complexity associated with decoding a transmit block may be related to the coding rate for the transmission. In some cases, the receiving device may decode a same TB using an increased quantity of parity bits due to HARQ combining (e.g., according to a coding based design), which may increase the computational complexity associated with decoding the TB. For example, the receiving device may decode an initial transmission of the TB using a first quantity of information bits and a first quantity of parity bits, and may decode a retransmission of the TB using the first quantity of information bits and a second (e.g., greater) quantity of parity bits, thereby reducing the effective coding rate for decoding the TB. In such examples, such as when the TB is encoded according to a relatively high modulation and coding scheme (MCS) order, decoding the retransmission may be significantly more complex than decoding the initial transmission (e.g., double the computational complexity).

In some cases, wireless devices (e.g., the UE 115-*a* and the network entity 105-*a*) may determine a transmission reliability for one or more bits of a set of coded bits. For example, the transmitting device may identify a reliability chart 210, which may include a likelihood that a bit is successfully received (e.g., entropy) with respect to a condition of the wireless channel (e.g., SNR) when demodulated by the receiving device. The reliability chart 210 may correspond to a set of bits mapped to a same modulation symbol (e.g., according to a high-order quadrature amplitude modulation (QAM) scheme) such that each bit of the set of bits corresponds to a respective transmission reliability. For example, a set of bits encoded according to a 256QAM scheme may include eight bits per modulation symbol. That is, a 256QAM modulation may include two 16 pulse-amplitude modulations (PAM), which may include four bits per modulation symbol. In such a symbol (e.g., a 16 PAM symbol), each bit of the set of bits may be associated with one of a transmission reliability 215, a transmission reliability 220, a transmission reliability 225, and a transmission reliability 230. In some cases, a reliability of a bit may be associated with a conditional entropy of the bit (e.g., conditioned on a received signal associated with the bit). For example, the transmission reliability 215 may represent a highest reliability (e.g., a lowest conditional entropy), the transmission reliability 220 may represent a second highest reliability, the transmission reliability 225 may represent a third highest reliability, and the transmission reliability 230 may represent a fourth highest reliability (e.g., a highest conditional entropy). In such cases, the transmitting device may transmit the bits such that a reliability of a bit is related to a significance of the bit (e.g., MSB has a higher reliability than the LSBs). In other words, the transmitting device may transmit the left-most bit of a set of bits (e.g., the MSB) with the transmission reliability 215, and may transmit the right-most bit of the set of bits (e.g., the LSB) with the transmission reliability 230.

To support high-throughput communications at a relatively high modulation order, a wireless devices may utilize a modulation based HARQ design. In some examples, a transmitting device operating according to the modulation based HARQ design may determine a bit ordering scheme for a retransmission of a HARQ payload. In one example, the transmitting device may select a subset of coded bits from an initial transmission to include in a retransmission of the HARQ payload. In some cases, the transmitting device may select the subset of bits based on identifying bits with the lowest reliabilities (e.g., as illustrated in the reliability chart 210) in the initial transmission. For example, the transmitting device may identify an initial transmission for a first set of bits (e.g., $B_0$, $B_1$, $B_2$, and $B_3$) and an initial transmission for a second set of bits (e.g., $B_4$, $B_5$, $B_6$, and $B_7$), which are ordered using a first bit ordering scheme. In such cases, the transmitting device may identify a first subset of bits including low-reliability bits from the first set of bits (e.g., $B_2$ and $B_3$) and a second subset of bits including low-reliability bits from the second set of bits (e.g., $B_6$ and $B_7$), and the low transmission reliabilities may be based on the first bit ordering scheme used to modulate the bits of the initial transmissions. The transmitting device may then modulate the first subset of bits and the second subset of bits using a reverse bit ordering (e.g., a second bit ordering scheme) to a modulation constellation. That is, the transmitting device may modulate the bits such that LSBs (or bits with the lowest reliability) from the initial transmissions are instead mapped to bit positions (e.g., MSBs) that have a higher reliability (e.g., a retransmission including $B_3$, $B_7$, $B_2$, and $B_6$, in order of reliability). Additionally, or alternatively, the transmitting device may transmit the retransmission according to a first modulation order that is different (e.g., smaller) than a second modulation order for the initial transmission. In such cases, a modulation symbol of a retransmission may include a smaller quantity of bits such as two bits. Thus, the first subset of bits (e.g., $B_2$ and $B_3$) are modulated to a first modulation symbol, and the second subset of bits (e.g., $B_6$ and $B_7$) are modulated to a second modulation symbol, where both the first subset and the second subset are modulated using a modulation order (e.g., 4 PAM) that is smaller than the first modulation order used for the initial transmissions.

In some examples, the transmission reliability of a bit (e.g., graphed by the reliability chart 210) may be associated with a probabilistic shaping function. In a probabilistically shaped system, a reliability for a set of locations on a QAM constellation may deviate from a uniform distribution (e.g., ordered by bit significance). In one example, a respective reliability for each bit of a set of bits may be measured by a conditional entropy of each bit of the set of bits, which may be conditioned on a received signal including the bit. Additionally, or alternatively, a reliability of a bit may be determined based on one or more parameters associated with the probabilistic shaping function (e.g., rather than the significance of each bit). Such parameters may include a modulation order, a scale parameter associated with probabilistic shaping, a probability profile (e.g., probabilities corresponding to constellation points for QAM) associated with the probabilistic shaping function, or any combination thereof. For example, a probabilistically shaped QAM constellation may be configured such that a second MSB (e.g., the second leftmost bit of the set of bits) of an initial transmission (e.g., a 256QAM transmission—a 16 pulse-amplitude modulation (PAM)) with Gray mapping corresponds to a highest bit reliability. In such an example, a retransmission (e.g., a 64QAM transmission) may select an MSB (e.g., the second bit), a second LSB, and an LSB for retransmission, and may map the selected bits to an LSB, a second LSB, and an MSB for the retransmission (e.g., according to the transmission reliabilities of a 64QAM probabilistically shaped constellation). As such, if the bit ordering is [$B_1$, $B_2$, $B_3$, $B_4$] for the initial transmission, then the retransmission (e.g., 64QAM) may have a bit ordering of [$B_3$, $B_4$, $B_1$]. Further, the transmitting device may determine the bit reliabilities independent from the channel quality (e.g., due to a reliability ordering being independent of the channel SNR).

In some cases, the transmitting device may transmit an indication to the receiving device to provide information associated with the bit modulation techniques. For example, the transmitting device may indicate the subset of bits for retransmission, an ordering of the bits (reverse bit ordering, a normal ordering, etc.), one or more bits to be flipped (e.g., reversed value), or any combination thereof. In some examples, such as when multiple retransmissions are scheduled, the wireless device may be configured with different configuration for each transmission, such as the bits that are to be retransmitted, the bit ordering (e.g., reverse bit ordering or now), the bits to flip, or any combination thereof). Additionally, or alternatively, the bit flipping configuration may be indicated with respect to bits included in an initial transmission, or may be determined with respect to bits included in a previous transmission (e.g., a most recent transmission). The receiver device (e.g., the UE) may be configured with these configurations for transmission and retransmissions using control signaling, such radio resource control signaling, medium access control layer control element (MAC-CE) signaling, control information signaling (e.g., downlink control information), or any combination thereof.

As such, using these techniques, the wireless devices (e.g., UE 115-*a* and network entity 105-*a*) of the wireless communications system 200 may support improved reliabilities for transmission based on a modulation based HARQ design that prioritizes low reliability bits from an initial transmission to high reliability positions for a retransmission or second transmission. Additional techniques described herein, such as bit value flipping and a hybrid design, further support improved reliabilities and reduced computational complexities at wireless devices of the wireless communications system 200.

Figure 3:
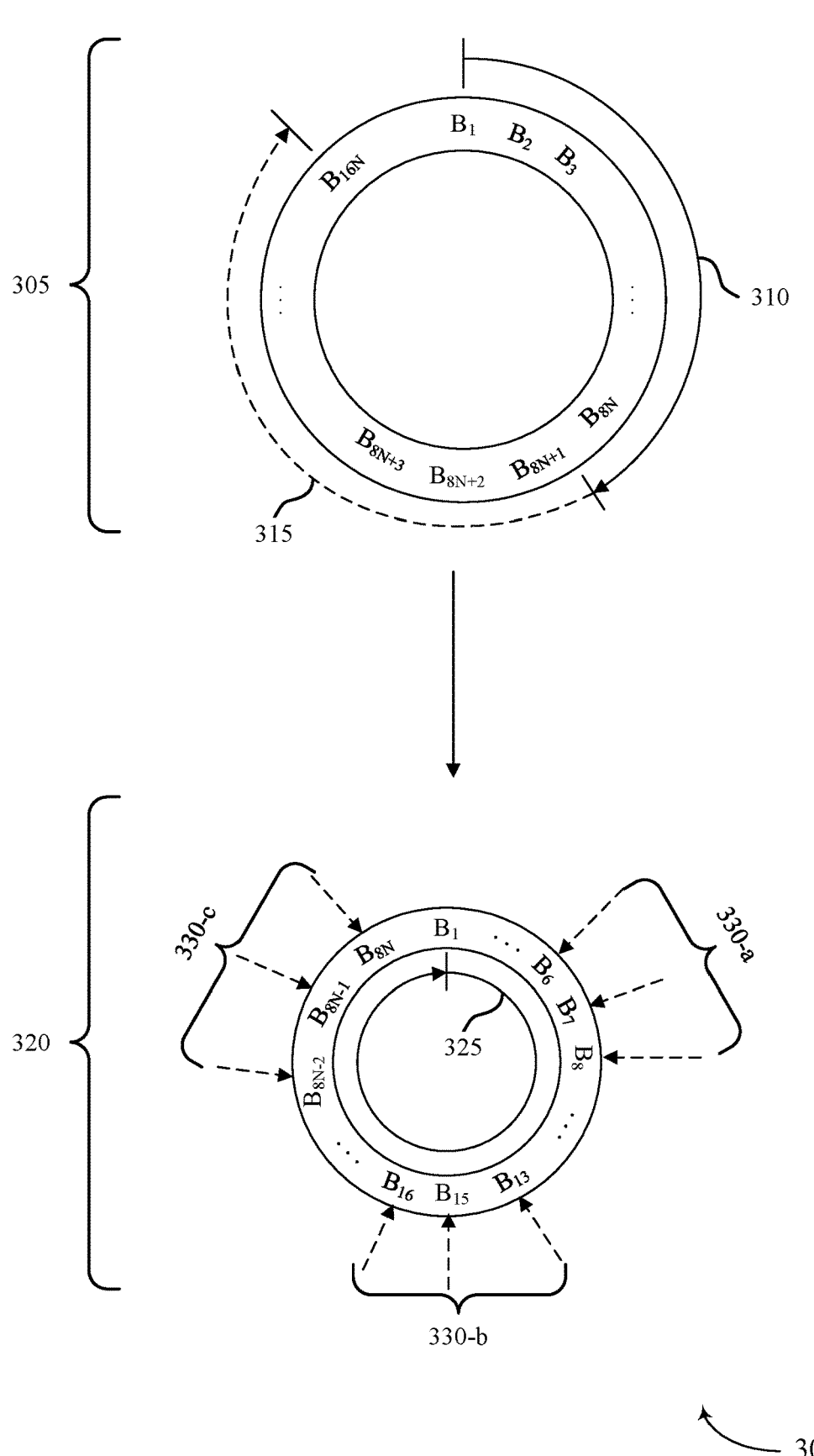
FIG. 3 illustrates an example of a buffer diagram that supports modulation based HARQ feedback retransmission design in accordance with one or more aspects of the present disclosure.

FIG. 3 illustrates an example of a buffer diagram 300 that supports modulation based HARQ feedback retransmission design in accordance with one or more aspects of the present disclosure. The buffer diagram 300 may be implemented by one or more aspects of the wireless communications system 200 and the wireless communications system 100. For example, the buffer diagram 300 may include a coding based HARQ buffer 305 (e.g., a data buffer), which may maintained by a wireless device (e.g., the UE 115-*a* or the network entity 105-*a*) operating according to a coding based HARQ design, as described with reference to FIG. 2. Additionally, the buffer diagram may include a modulation based HARQ buffer 320 (e.g., a data buffer), which may be maintained by a wireless device operating according to the modulation based HARQ design, as described with reference to FIG. 2.

In some examples, the coding based HARQ buffer 305 may include a quantity of bits stored after communicating an initial transmission 310 and a retransmission 315 of a transmit block. For instance, the initial transmission 310 may result in the coding based HARQ buffer 305 storing an integer quantity of bytes (e.g., 8N bits), and the retransmission 315 may result in the coding based HARQ buffer 305 storing an additional quantity of bits (e.g., bits $B_{8N+1}$ to $B_{16N}$, or a different quantity of bits). As the wireless device (e.g., operating according to a coding based HARQ design) receives subsequent retransmissions, the quantity of bits stored to the coding based HARQ buffer 305 may incur significant memory costs at the wireless device, as well as reducing an effective coding rate for retransmissions (e.g., increasing computational complexity).

To support reducing memory usage associated with maintaining a data buffer, the wireless device may maintain the modulation based HARQ buffer 320 (e.g., operating according to the modulation based HARQ design). In some examples, the wireless device may store a quantity of bits (e.g., bits $B_1$ to $B_{8N}$) corresponding to an initial transmission 325 of a HARQ payload that are modulated according to a first bit ordering scheme for the initial transmission. In some cases, the wireless device may determine one or more subsets of bits to modulate using techniques described with reference to FIG. 2. For example, the wireless device may identify a portion of bits of the initial transmission (e.g., bits $B_5$, $B_6$, $B_7$, $B_8$) associated with low reliabilities to include in a retransmission. The retransmission may include one or more bit subsets 330 (e.g., a bit subset 330-*a*, a bit subset 330-*b*, and a bit subset 330-*c*), and the wireless device may mitigate memory usage due to not storing additional bits in the modulation based HARQ buffer 320. In one example, the wireless device may perform one or more initial transmissions with bits $b_1$, . . . , $b_{8n}$ according to a 256QAM modulation. For the retransmission, the wireless device may select bit subsets from the one or more initial transmissions (e.g., $b_5$, . . . , $b_8$, $b_{13}$, . . . , $b_{16}$, and $b_{8n-3}$, . . . $b_{8N}$) and may interleave the one or more bit subsets 330 to perform the retransmission according to a 16QAM modulation. As described herein, the bit ordering may be reversed such that the bits mapped to the LSBs of the initial transmission are mapped to the MSBs of the retransmission. That is, the second bit ordering scheme for the second transmission (e.g., retransmission) may reverse the significance (based on transmission reliability) of at least a subset of the bits of the initial transmission. In some examples, for a retransmission, a portion of the bits may be modified (e.g., reversed or reordered) compared to an initial transmission, which may support improved performance upon retransmission. The transmission reliabilities of the bits of the initial transmission and the retransmission may be dependent on the respective modulation orders used for the initial transmission and the retransmission.

Figure 4:
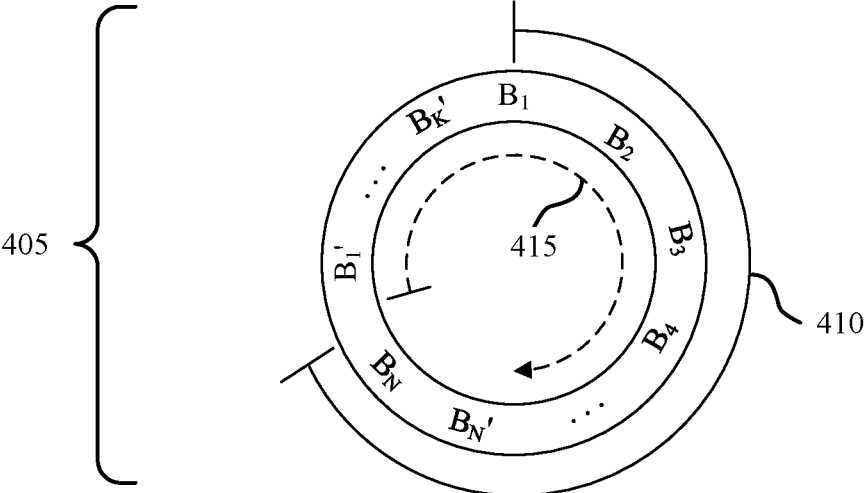
FIG. 4 illustrates an example of a buffer diagram that supports modulation based HARQ feedback retransmission design in accordance with one or more aspects of the present disclosure.

FIG. 4 illustrates an example of a buffer diagram 400 that supports modulation based HARQ feedback retransmission design in accordance with one or more aspects of the present disclosure. In some examples, the buffer diagram 400 may illustrate a hybrid buffer 405, which may be an example of a buffer maintained by a wireless device implementing aspects of both a coding based HARQ design and a modulation base HARQ design. The hybrid buffer 405 may include bits associated with an initial transmission 410 and a retransmission 415, which may include data bits (e.g., feedback bits) and parity bits.

In some examples, the wireless device may implement a hybrid design (e.g., including aspects of coding based HARQ design and modulation based HARQ design) for maintaining the hybrid buffer 405 (e.g., a HARQ buffer). For example, the wireless device may first transmit the initial transmission 410, which includes bits $B_1$ to $B_N$). At substantially high coding rates for an initial transmission, the wireless device may prioritize retransmitting additional parity bits (e.g., such as in IR-HARQ), and the parity bits may include bits $B_1'$ to $B_K'$. Thus, the wireless device may select some of the parity bits (e.g., bits $B_1'$ to $B_K'$) for retransmission until satisfying a coding rate threshold (e.g., a coding rate of 3/4) for the retransmission. In some cases, the coding rate threshold may be a minimum coding rate threshold associated with limited buffer rate matching (LBRM). For example, a coding-based HARQ design may be associated with a first LBRM minimum coding rate threshold (e.g., limiting rate of 2/3), and a hybrid HARQ design may be with a second LBRM minimum coding rate threshold that is higher than the first LBRM threshold (e.g., limiting rate of 3/4) to support a smaller buffer size relative to using only the coding based HARQ design. Thus, the wireless device may configure a HARQ buffer size based on determining a minimum coding rate threshold according to an LBRM configuration for the hybrid design. In some examples, after selecting new parity bits until satisfying the coding rate threshold, the wireless device may select a subset of bits from the initial transmission to include in the retransmission (e.g., bits $B_{K+1}'$ to $B_N'$). The wireless device may determine the subset of bits based on the reliabilities of the bits using techniques as described with reference to FIG. 2.

After selecting a set of bits (e.g., parity bits and low-reliability bits) for retransmission, the wireless device may map the selected new parity bits (e.g., bits $B_1'$ to $B_K'$) to constellation locations with the highest transmission reliabilities (e.g., due to a lack of information for the new parity bits form the initial transmission). The wireless device may then map the low-reliability bits (e.g., previously mapped LSBs in the initial transmission) for retransmission. In such a configuration, the network entity 105 may maintain the hybrid buffer 405, which may have a size associated with a maximum TB size and the minimum coding rate threshold for the hybrid design (e.g., an LBRM threshold). That is, a maximum TB size of $K_{MAX}$ and a LBRM coding rate threshold of $R'_{LBRM}$ may correspond to a size of $$\frac{K_{MAX}}{R'_{LBRM}}$$

for the hybrid buffer 405. Additionally, or alternatively, the wireless device may reverse an ordering (e.g., using a second bit ordering scheme) of the low-reliability bits (e.g., included in the initial transmission), and may transmit the retransmission according to a lower modulation order than the initial transmission.

Figure 5:
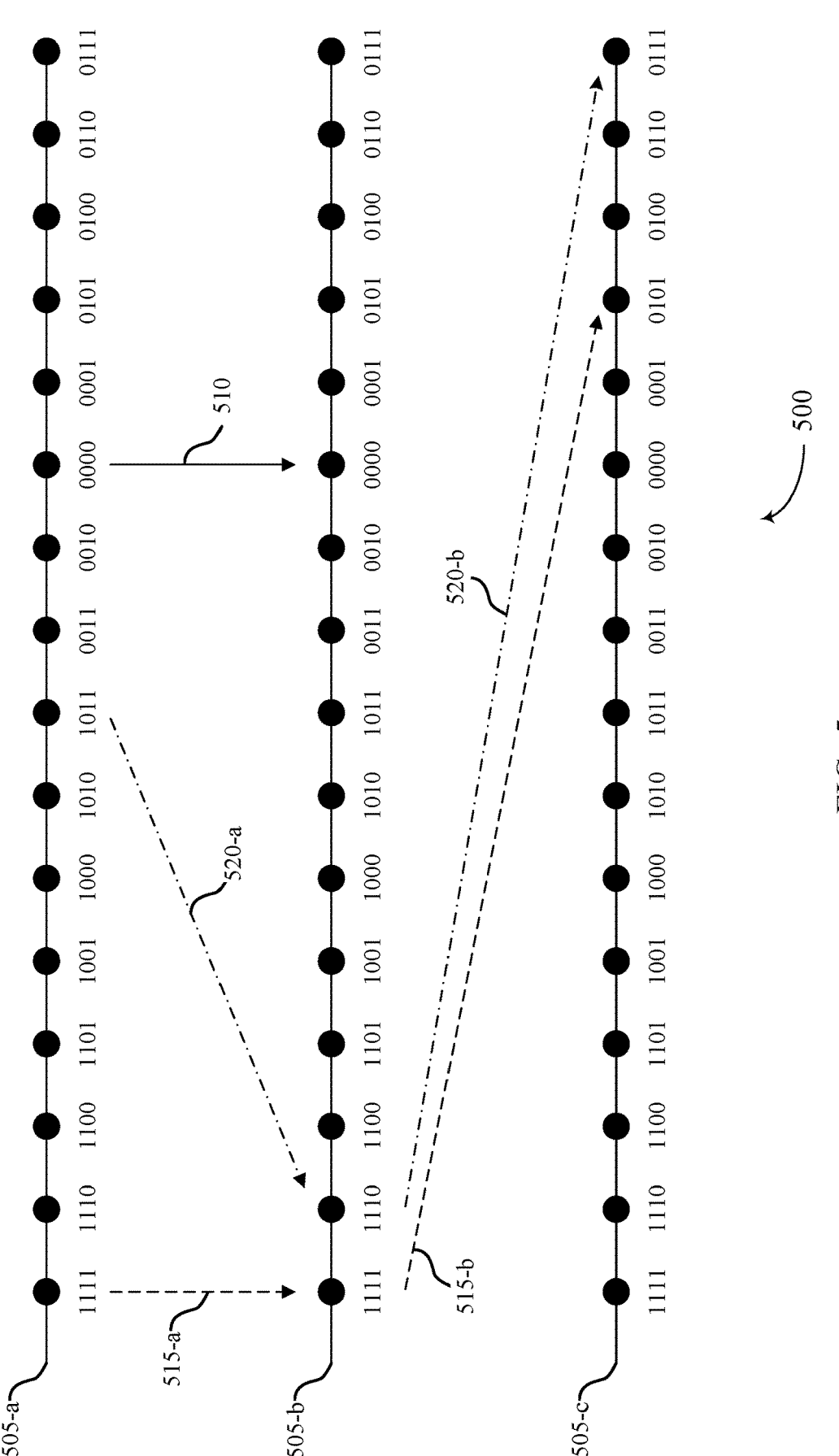
FIG. 5 illustrates an example of a bit ordering scheme that supports modulation based HARQ feedback retransmission design in accordance with one or more aspects of the present disclosure.

FIG. 5 illustrates an example of a bit ordering scheme 500 that supports modulation based HARQ feedback retransmission design in accordance with one or more aspects of the present disclosure. In some examples, the bit ordering scheme 500 may be implemented by one or more aspects of the wireless communications system 200 and the wireless communications system 100. For example, the bit ordering scheme 500 may be implemented by a wireless device (e.g., the UE 115-*a* or the network entity 105-*a*) communicating according to a modulation based HARQ design, as described with reference to FIG. 2. The bit ordering scheme 500 may include a bit ordering mapping 505-*a*, a bit ordering mapping 505-*b*, and a bit ordering mapping 505-*c*, which may be examples of an ordering of bits after performing bit modulation techniques after determining low-reliability bits.

In some cases, a wireless device may perform a bit reversal for mapping a set of bits associated with a modulation symbol for a retransmission of a data payload. Such techniques may support low-reliability bits from an initial transmission being mapped to have higher reliabilities for the retransmission. However, some bit orderings may result in insignificant changes in modulation power for a set of bits after performing the bit reversal. For example, the wireless device may reverse a set of bits (e.g., bits '0000') as part of an operation 510, which may result in a same ordering of the bits despite the bit-reversal.

To support increased modulation power for such a set of bits, the wireless device may flip a value of a subset of the set of bits in addition to the bit-reversal. For example, as part of an operation at 515, the wireless device may perform the bit-reversal for a set of bits at 515-*a* (e.g., '1111'), and may then flip values for a subset of the set of bits (e.g., the first bit and the third bit) at 515-*b* to support increased modulation power (e.g., '0101' including different mappings). In another example, the wireless device may first flip values for a different subset of the set of bits (e.g., the second bit and the fourth bit) prior to reversing the set of bits. For example, as part of an operation at 520, the wireless device may flip the subset of the set of bits (e.g., '1011' to '1110'), and may then reverse an ordering of the bits (e.g., '1110' to '0111').

In some examples, the bit value flipping technique may be performed after selection of the bits that are to be included in the second transmission (e.g., retransmission). For example, as described with respect to FIGS. 2 and 3, the wireless device may select LSBs from one or more initial transmissions for the retransmissions, order the bits in a reverse order of significance (e.g., in terms of transmission reliability), then flip bit values of a subset of the ordered bits. The set of bits may then be mapped to a modulation order/constellation for transmission (e.g., the second transmission). The bit flipping technique may also be applicable when the wireless device selects and/or priorities parity bits for the second transmission. In such cases, the UE selects parity bits from the data buffer, selects LSBs of an initial transmission, orders the bits according to a second ordering scheme, and flips a subset of the bits. The bits may then be mapped to the modulation order/constellation for transmission (e.g., the second transmission). As described with respect to FIG. 3, the second ordering scheme may prioritize the parity bits (in terms of transmission reliability) for the second transmission.

In some wireless communications systems, bits may be scrambled before passing to a modulator or modulation component. In cases where a subset of bit values are flipped for a second or retransmission, the wireless device may use a same scrambling identifier for the initial transmission and retransmission to scramble the bits to generate the corresponding scrambling sequences.

Figure 6:
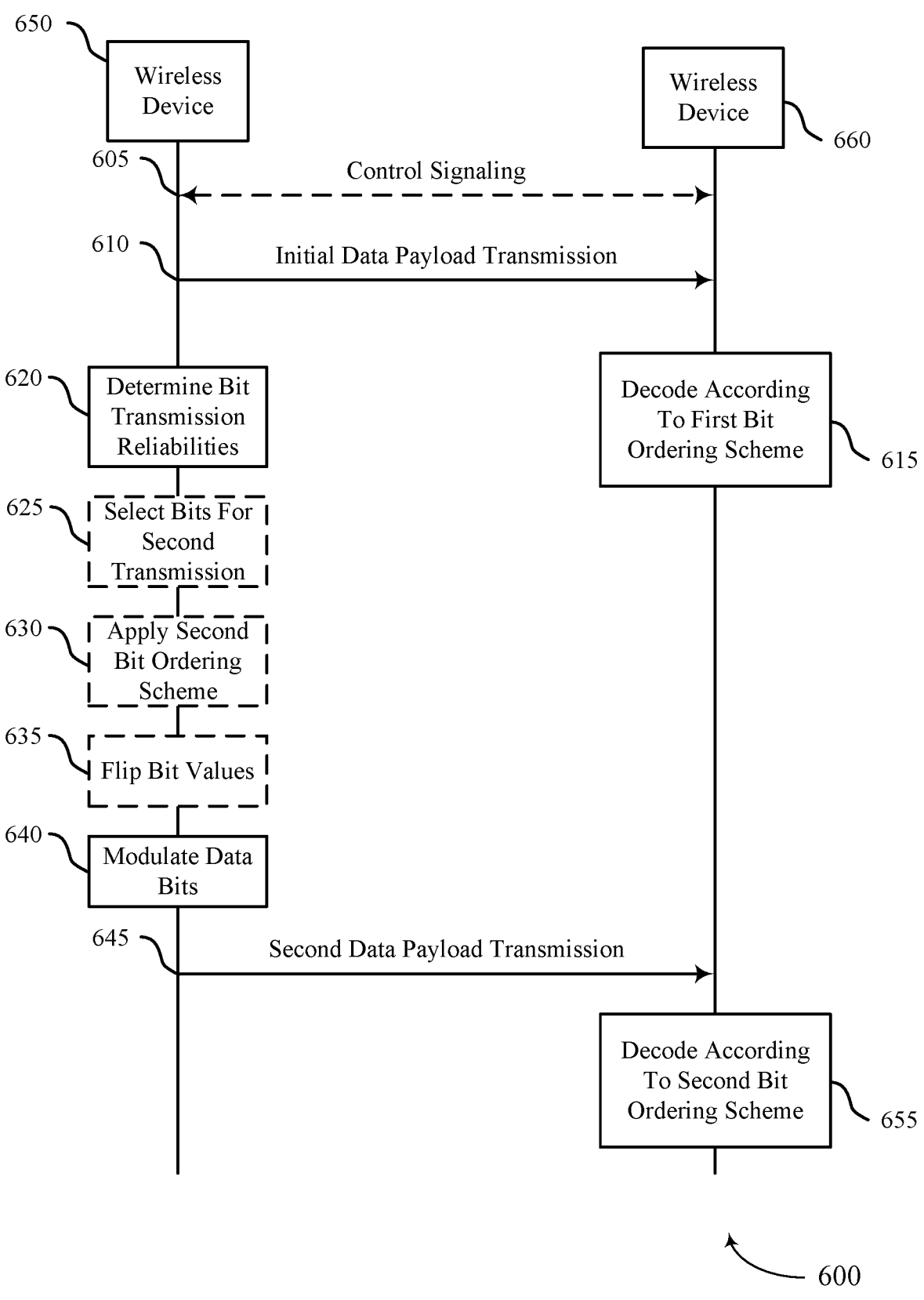
FIG. 6 illustrates an example of a process flow that supports modulation based HARQ feedback retransmission design in accordance with one or more aspects of the present disclosure.

FIG. 6 illustrates an example of a process flow 600 that supports modulation based HARQ feedback retransmission design in accordance with one or more aspects of the present disclosure. The process flow 600 includes a wireless device 650 and a wireless device 660, which may be examples of the UEs 115, the network entities 105, or both, as described with respect to FIGS. 1 and 2. For example, the wireless device 605 may be an example of a UE 115, and the wireless device 660 may be an example of a network entity 105. In another example, the wireless device 650 is the network entity 105, and the wireless device 660 is the UE 115. In some examples, both wireless device 650 and wireless device 660 are examples of the UEs 115. In the following description of the process flow 600, the operations between the wireless device 650 and the wireless device 660 may be transmitted in a different order than the example order shown, or the operations performed may be performed in different orders or at different times. Some operations may also be omitted from the process flow 600, and other operations may be added to the process flow 600.

At 605, the wireless device 650 and the wireless device 660 may communicate control signaling that indicates a first bit ordering scheme, a second bit ordering scheme, or both that the wireless devices 650 and 660 are used to for communicating data payloads. In some examples, the control signaling may indicate one or more bit positions that are to be flipped for retransmissions, modulating and ordering schemes that are to be used for initial transmissions and retransmissions, a prioritization rule for prioritizing parity bits over retransmitted bits, a coding rate threshold, or a combination thereof. To communicate the control signaling, the wireless device 660 may transmit the control signaling, and the wireless device 650 may receive the control signaling. Additionally, or alternatively, the wireless device 650 may transmit, and the wireless device 660 may receive the control signaling.

At 610, the wireless device 650 may transmit an initial transmission associated with a data payload. The initial transmission may include a set of bits modulated using a first bit ordering scheme, and a first bit subset of the set of bits may be associated with lower transmission reliability than a second bit subset of the set of bits. The data payload may be a HARQ payload or a feedback payload. The HARQ payload may include feedback bits and/or parity bits. The bits may be selected from a buffer, such as a HARQ buffer. The initial transmission may be modulated using a first modulation and coding scheme. In some examples, the first modulating and coding scheme is a probabilistic shaping modulation. The first bit subset being associated with the lower transmission reliability than a second bit subset of the set of bits may be based on the probabilistic shaping modulation.

At 615, the wireless device 660 may attempt to decode the initial transmission according to the first bit ordering scheme and/or the first modulation order.

At 620, the wireless device 650 may determine bit transmission reliabilities of the initial transmission. For example, the wireless device 650 may determine conditional entropies of the bits based on a modulation order used for the initial transmission.

At 625, the wireless device 650 may select bits for a second transmission (e.g., retransmission) associated with the data payload. For example, the wireless device 650 may select the first bit subset of the initial transmission for the second transmission based on the determined transmission reliability. That is, the wireless device 650 may select the first bit subset because the bits of the first bit subset had a low transmission reliability relative to other bits of the initial transmission. The wireless device 650 may also select parity bits from a data buffer (e.g., HARQ buffer) associated with the data payload. The parity bits may be selected until a coding rate threshold is satisfied. The wireless device 650 may additionally or alternatively select bits from other initial transmissions to include in the second transmission based on the transmission reliabilities of the bits of the other initial transmissions.

At 630, the wireless device 650 may apply a second bit ordering scheme that changes the order of the bits in the second transmission relative to the initial transmission. For example, the wireless device 650 may apply the second bit ordering scheme that orders bits of the first bit subset such that a bit of the first bit subset that is transmitted, via the initial transmission, with a lower transmission reliability among bits of the first bit subset is associated with a higher transmission reliability among the bits of the first bit subset for the second transmission. Additionally, or alternatively, the wireless device 650 may apply the second bit ordering scheme that reverses a bit ordering that was used for the initial transmission of the first bit subset. In some examples, the second bit ordering scheme may prioritize the parity bits based on transmission reliabilities of the second transmission.

At 635, the wireless device 650 may flip a bit value for each bit of a subset of bits of the first bit subset. For example, the subset of data bits for the second transmission may be flipped (e.g., the first and third bits or the second and fourth bits). Flipping the value may include change a "0" to a "1" or a "1" to a "0."

At 640, the wireless device 650 may modulate at least the first bit subset using the second bit ordering scheme that differs from the first bit ordering scheme to generate a modulated bit set. The second bit ordering scheme may be associated with higher transmission reliability for the first bit subset. In some examples, modulating the first bit subset may include mapping the bits (e.g., first bit subset or the first bit subset and the selected other bits) to a modulation order to generate the modulated bit set. The modulation order may be a lower modulation order than the modulation order used for the initial transmission. In some examples, the second modulation order for the second transmission is a probabilistic shaping modulation. The second bit ordering scheme may be based on the probabilistic shaping modulation.

At 645, the wireless device 650 may transmit the second transmission associated with the data payload, and the second transmission may include the modulated bit set.

At 655, the wireless device 650 may decode the second transmission according to the second bit ordering scheme. In some examples, the wireless device 650 may decode the second transmission based on the flipped bit values for the second transmission.

Figure 7:
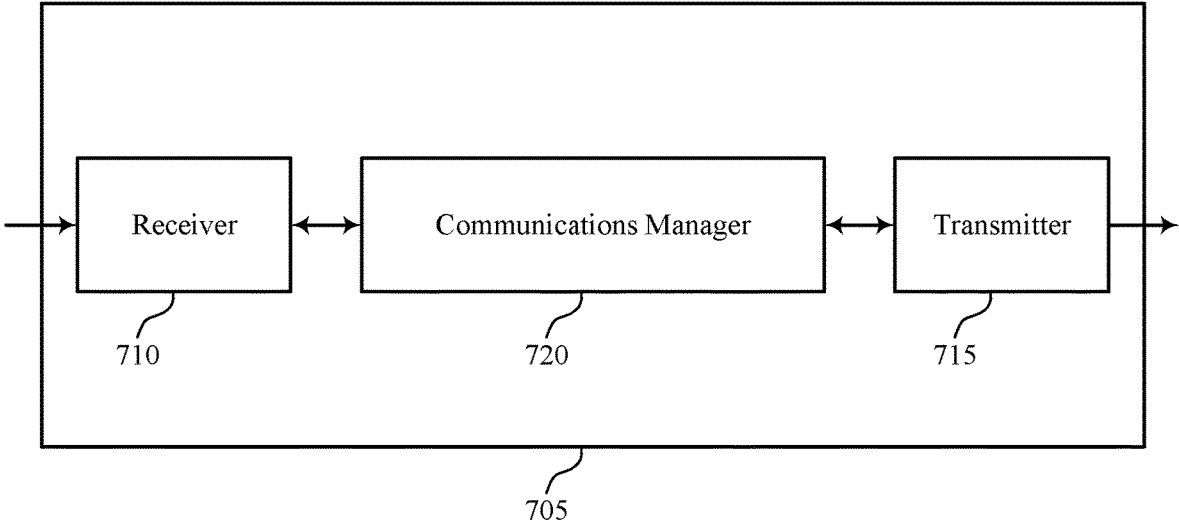
FIGS. 7 and 8 show block diagrams of devices that support modulation based HARQ feedback retransmission design in accordance with one or more aspects of the present disclosure.

FIG. 7 shows a block diagram 700 of a device 705 that supports modulation based HARQ feedback retransmission design in accordance with one or more aspects of the present disclosure. The device 705 may be an example of aspects of a UE 115 as described herein. The device 705 may include a receiver 710, a transmitter 715, and a communications manager 720. The device 705 may also include a processor.

Each of these components may be in communication with one another (e.g., via one or more buses).

The receiver 710 may provide a means for receiving information such as packets, user data, control information, or any combination thereof associated with various information channels (e.g., control channels, data channels, information channels related to modulation based HARQ feedback retransmission design). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to modulation based HARQ feedback retransmission design). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of modulation based HARQ feedback retransmission design as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software) executed by a processor. If implemented in code executed by a processor, the functions of the communications manager 720, the receiver 710, the transmitter 715, or various combinations or components thereof may be performed by a general-purpose processor, a DSP, a CPU, GPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at wireless device in accordance with examples as disclosed herein. For example, the communications manager 720 may be configured as or otherwise support a means for transmitting an initial transmission associated with a data payload, the initial transmission including a set of bits modulated using a first bit ordering scheme, a first bit subset of the set of bits associated with lower transmission reliability than a second bit subset of the set of bits. The communications manager 720 may be configured as or otherwise support a means for modulating the first bit subset using a second bit ordering scheme that differs from the first bit ordering scheme to generate a modulated bit set, the second bit ordering scheme associated with higher transmission reliability for the first bit subset. The communications manager 720 may be configured as or otherwise support a means for transmitting a second transmission associated with the data payload including the modulated bit set.

Additionally, or alternatively, the communications manager 720 may support wireless communication at a wireless device in accordance with examples as disclosed herein. For example, the communications manager 720 may be configured as or otherwise support a means for receiving an initial transmission associated with a data payload, the initial transmission including a set of bits modulated using a first bit ordering scheme, a first bit subset of the set of bits associated with lower transmission reliability than a second bit subset of the set of bits. The communications manager 720 may be configured as or otherwise support a means for receiving a second transmission associated with the data payload including a second set of bits modulated using a second bit ordering scheme that differs from the first bit ordering scheme and results in a modulated bit set, the second bit ordering scheme associated with higher transmission reliability for the first bit subset.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for improved memory usage (e.g., buffer memory) as the data bits or feedback bits are transmitted in a manner to improve reliability of retransmissions, thereby reducing possibility of failed or undecodable transmissions. These techniques support higher throughput by more efficiently using a buffer which may be implemented in memory of a device.

Figure 8:
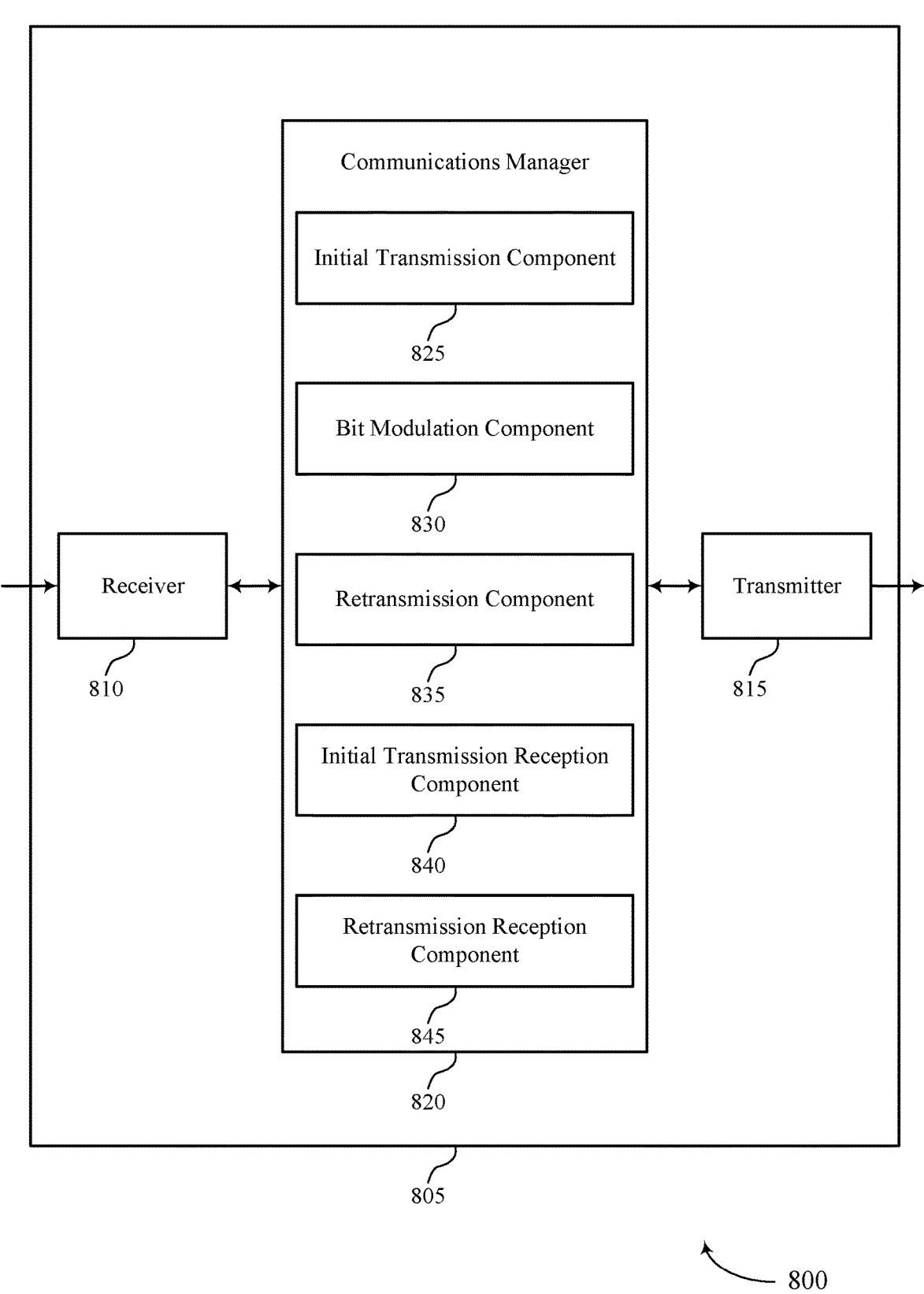

FIG. 8 shows a block diagram 800 of a device 805 that supports modulation based HARQ feedback retransmission design in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to modulation based HARQ feedback retransmission design). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to modulation based HARQ feedback retransmission design). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of modulation based HARQ feedback retransmission design as described herein. For example, the communications manager 820 may include an initial transmission component 825, a bit modulation component 830, a retransmission component 835, an initial transmission reception component 840, a retransmission reception component 845, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at wireless device in accordance with examples as disclosed herein. The initial transmission component 825 may be configured as or otherwise support a means for transmitting an initial transmission associated with a data payload, the initial transmission including a set of bits modulated using a first bit ordering scheme, a first bit subset of the set of bits associated with lower transmission reliability than a second bit subset of the set of bits. The bit modulation component 830 may be configured as or otherwise support a means for modulating the first bit subset using a second bit ordering scheme that differs from the first bit ordering scheme to generate a modulated bit set, the second bit ordering scheme associated with higher transmission reliability for the first bit subset. The retransmission component 835 may be configured as or otherwise support a means for transmitting a second transmission associated with the data payload including the modulated bit set.

Additionally, or alternatively, the communications manager 820 may support wireless communication at a wireless device in accordance with examples as disclosed herein. The initial transmission reception component 840 may be configured as or otherwise support a means for receiving an initial transmission associated with a data payload, the initial transmission including a set of bits modulated using a first bit ordering scheme, a first bit subset of the set of bits associated with lower transmission reliability than a second bit subset of the set of bits. The retransmission reception component 845 may be configured as or otherwise support a means for receiving a second transmission associated with the data payload including a second set of bits modulated using a second bit ordering scheme that differs from the first bit ordering scheme and results in a modulated bit set, the second bit ordering scheme associated with higher transmission reliability for the first bit subset.

Figure 9:
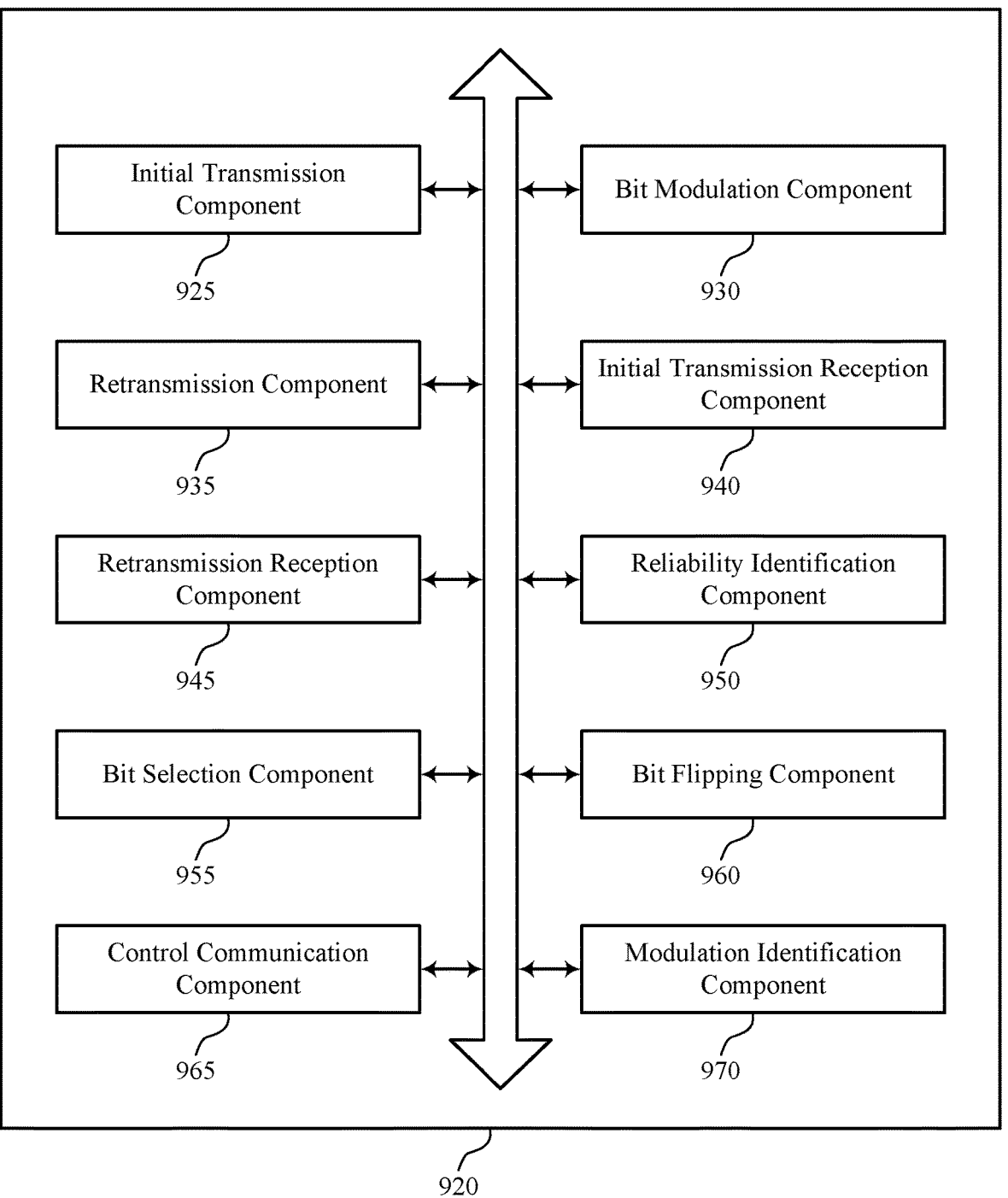
FIG. 9 shows a block diagram of a communications manager that supports modulation based HARQ feedback retransmission design in accordance with one or more aspects of the present disclosure.

FIG. 9 shows a block diagram 900 of a communications manager 920 that supports modulation based HARQ feedback retransmission design in accordance with one or more aspects of the present disclosure. The communications manager 920 may be an example of aspects of a communications manager 720, a communications manager 820, or both, as described herein. The communications manager 920, or various components thereof, may be an example of means for performing various aspects of modulation based HARQ feedback retransmission design as described herein. For example, the communications manager 920 may include an initial transmission component 925, a bit modulation component 930, a retransmission component 935, an initial transmission reception component 940, a retransmission reception component 945, a reliability identification component 950, a bit selection component 955, a bit flipping component 960, a control communication component 965, a modulation identification component 970, or any combination thereof. Each of these components may communicate, directly or indirectly, with one another (e.g., via one or more buses).

The communications manager 920 may support wireless communication at wireless device in accordance with examples as disclosed herein. The initial transmission component 925 may be configured as or otherwise support a means for transmitting an initial transmission associated with a data payload, the initial transmission including a set of bits modulated using a first bit ordering scheme, a first bit subset of the set of bits associated with lower transmission reliability than a second bit subset of the set of bits. The bit modulation component 930 may be configured as or otherwise support a means for modulating the first bit subset using a second bit ordering scheme that differs from the first bit ordering scheme to generate a modulated bit set, the second bit ordering scheme associated with higher transmission reliability for the first bit subset. The retransmission component 935 may be configured as or otherwise support a means for transmitting a second transmission associated with the data payload including the modulated bit set.

In some examples, to support modulating the first bit subset using the second bit ordering scheme, the bit modulation component 930 may be configured as or otherwise support a means for modulating the first bit subset using the second bit ordering scheme that orders bits of the first bit subset such that a bit of the first bit subset that is transmitted, via the initial transmission, with a lower transmission reliability among bits of the first bit subset is associated with a higher transmission reliability among the bits of the first bit subset for the second transmission.

In some examples, to support modulating the first bit subset using the second bit ordering scheme, the bit modulation component 930 may be configured as or otherwise support a means for modulating the first bit subset using the second bit ordering scheme that reverses a bit ordering that was used for the initial transmission of the first bit subset.

In some examples, the set of bits of the initial transmission are modulated using a first modulation order. In some examples, the modulated bit set of the second transmission is modulated using a second modulation order, where the second modulation order is a lower modulation order than the first modulation order.

In some examples, to support modulating the first bit subset using the second bit ordering scheme, the reliability identification component 950 may be configured as or otherwise support a means for determining a conditional entropy corresponding to a modulation order used for modulating the set of bits for the initial transmission. In some examples, to support modulating the first bit subset using the second bit ordering scheme, the bit selection component 955 may be configured as or otherwise support a means for selecting the first bit subset for the second transmission based on the first bit subset having a higher conditional entropy than the second bit subset. In some examples, to support modulating the first bit subset using the second bit ordering scheme, the bit modulation component 930 may be configured as or otherwise support a means for modulating the selected first bit subset using the second bit ordering scheme.

In some examples, the bit flipping component 960 may be configured as or otherwise support a means for flipping a bit value for each bit of a subset of bits of the first bit subset. In some examples, the bit modulation component 930 may be configured as or otherwise support a means for mapping the first bit subset that includes the flipped bit value to a modulation order to generate the modulated bit set.

In some examples, the set of bits of the initial transmission and the first bit subset of the second transmission are scrambled using a same scrambling identifier.

In some examples, the bit selection component 955 may be configured as or otherwise support a means for selecting, for inclusion with the second transmission, one or more parity bits from a data buffer associated with the data payload.

In some examples, the second bit ordering scheme prioritizes the one or more parity bits such that the one or more parity bits are associated with a higher transmission reliability than the first bit subset.

In some examples, the second bit ordering scheme reverses an order of bits of the first bit subset.

In some examples, to support selecting the one or more parity bits, the bit selection component 955 may be configured as or otherwise support a means for selecting the one or more parity bits until a coding rate threshold is satisfied for the second transmission.

In some examples, the set of bits of the initial transmission are modulated using a probabilistic shaping modulation, the first bit subset being associated with lower transmission reliability than a second bit subset of the set of bits based on the probabilistic shaping modulation.

In some examples, the second bit ordering scheme prioritizes the first bit subset based on transmission reliabilities of bit positions for the probabilistic shaping modulation.

In some examples, the control communication component 965 may be configured as or otherwise support a means for communicating control signaling that indicates the first bit ordering scheme, the second bit ordering scheme, or both.

Additionally, or alternatively, the communications manager 920 may support wireless communication at a wireless device in accordance with examples as disclosed herein. The initial transmission reception component 940 may be configured as or otherwise support a means for receiving an initial transmission associated with a data payload, the initial transmission including a set of bits modulated using a first bit ordering scheme, a first bit subset of the set of bits associated with lower transmission reliability than a second bit subset of the set of bits. The retransmission reception component 945 may be configured as or otherwise support a means for receiving a second transmission associated with the data payload including a second set of bits modulated using a second bit ordering scheme that differs from the first bit ordering scheme and results in a modulated bit set, the second bit ordering scheme associated with higher transmission reliability for the first bit subset.

In some examples, the second bit ordering scheme orders bits of the first bit subset such that a bit of the first bit subset that is received, via the initial transmission, with a lower transmission reliability among bits of the first bit subset is associated with a higher transmission reliability among the bits of the first bit subset for the second transmission.

In some examples, the second bit ordering scheme reverses a bit ordering that was used for the initial transmission of the first bit subset.

In some examples, the set of bits of the initial transmission are modulated using a first modulation order. In some examples, the second set of bits of the second transmission is modulated using a second modulation order, where the second modulation order is a lower modulation order than the first modulation order.

In some examples, the first bit subset includes a flipped bit value for each bit of a subset of bits of the first bit subset.

In some examples, the set of bits of the initial transmission and the first bit subset of the second transmission are scrambled using a same scrambling identifier.

In some examples, the second transmission includes one or more parity bits.

In some examples, the second bit ordering scheme prioritizes the one or more parity bits such that the one or more parity bits are associated with a higher transmission reliability than the first bit subset.

In some examples, the second bit ordering scheme reverses an order of bits of the first bit subset.

In some examples, the set of bits of the initial transmission are modulated using a probabilistic shaping modulation, the first bit subset being associated with lower transmission reliability than a second bit subset of the set of bits based on the probabilistic shaping modulation.

In some examples, the second bit ordering scheme prioritizes the first bit subset based on transmission reliabilities of bit positions for the probabilistic shaping modulation.

In some examples, the control communication component 965 may be configured as or otherwise support a means for communicating control signaling that indicates the first bit ordering scheme, the second bit ordering scheme, or both.

Figure 10:
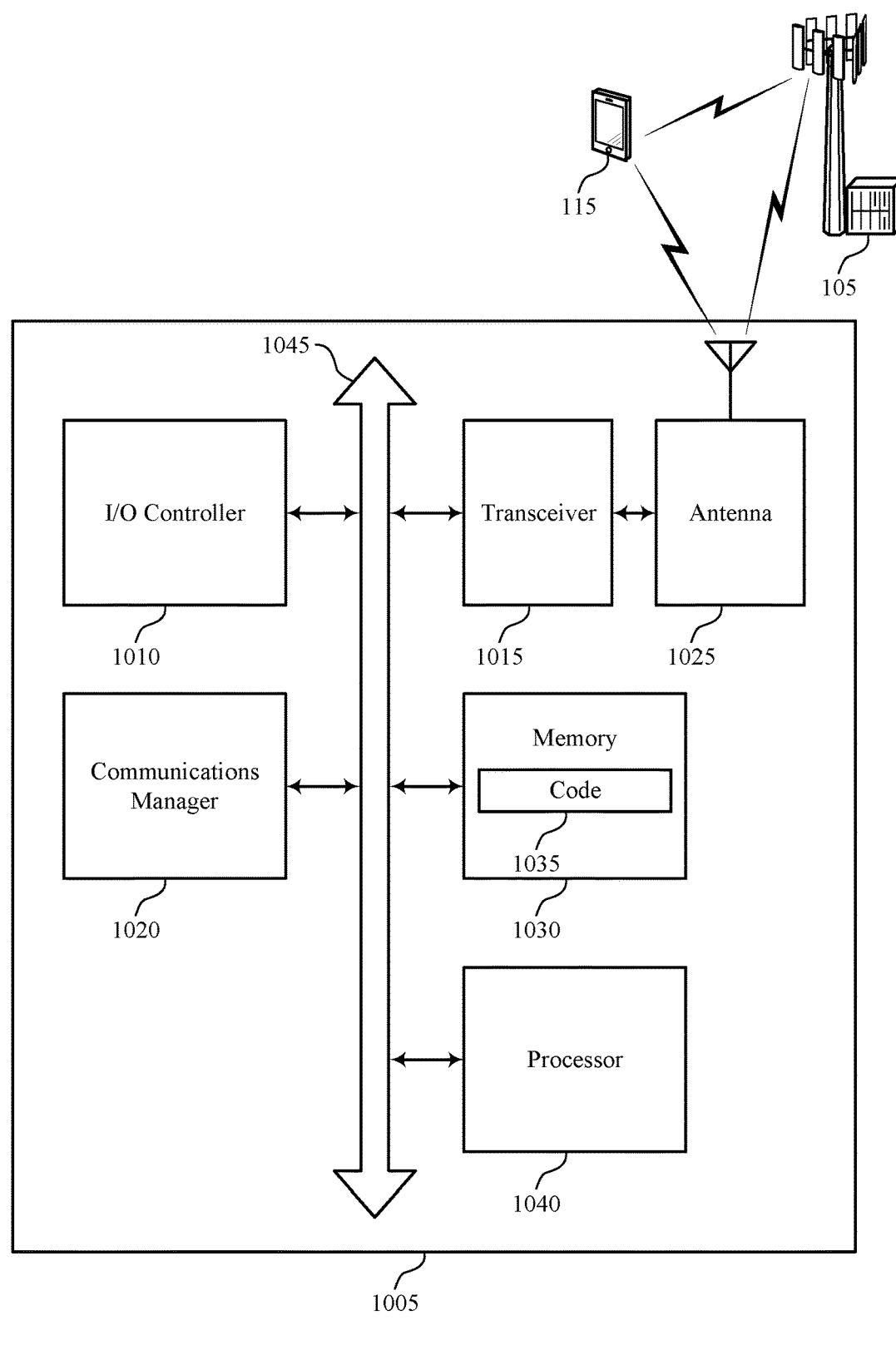
FIG. 10 shows a diagram of a system including a device that supports modulation based HARQ feedback retransmission design in accordance with one or more aspects of the present disclosure.

FIG. 10 shows a diagram of a system 1000 including a device 1005 that supports modulation based HARQ feedback retransmission design in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WIN- DOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a GPU a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting modulation based HARQ feedback retransmission design). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at wireless device in accordance with examples as disclosed herein. For example, the communications manager 1020 may be configured as or otherwise support a means for transmitting an initial transmission associated with a data payload, the initial transmission including a set of bits modulated using a first bit ordering scheme, a first bit subset of the set of bits associated with lower transmission reliability than a second bit subset of the set of bits. The communications manager 1020 may be configured as or otherwise support a means for modulating the first bit subset using a second bit ordering scheme that differs from the first bit ordering scheme to generate a modulated bit set, the second bit ordering scheme associated with higher transmission reliability for the first bit subset. The communications manager 1020 may be configured as or otherwise support a means for transmitting a second transmission associated with the data payload including the modulated bit set.

Additionally, or alternatively, the communications manager 1020 may support wireless communication at a wireless device in accordance with examples as disclosed herein. For example, the communications manager 1020 may be configured as or otherwise support a means for receiving an initial transmission associated with a data payload, the initial transmission including a set of bits modulated using a first bit ordering scheme, a first bit subset of the set of bits associated with lower transmission reliability than a second bit subset of the set of bits. The communications manager 1020 may be configured as or otherwise support a means for receiving a second transmission associated with the data payload including a second set of bits modulated using a second bit ordering scheme that differs from the first bit ordering scheme and results in a modulated bit set, the second bit ordering scheme associated with higher transmission reliability for the first bit subset.

By including or configuring the communications manager 1020 in accordance with examples as described herein, the device 1005 may support techniques for improved memory usage (e.g., buffer memory) as the data bits or feedback bits are transmitted in a manner to improve reliability of retransmissions, thereby reducing possibility of failed or undecodable transmissions. These techniques support higher throughput by more efficiently using a buffer which may be implemented in memory of a device.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of modulation based HARQ feedback retransmission design as described herein, or the processor 1040 and the memory 1030 may be otherwise configured to perform or support such operations.

Figure 11:
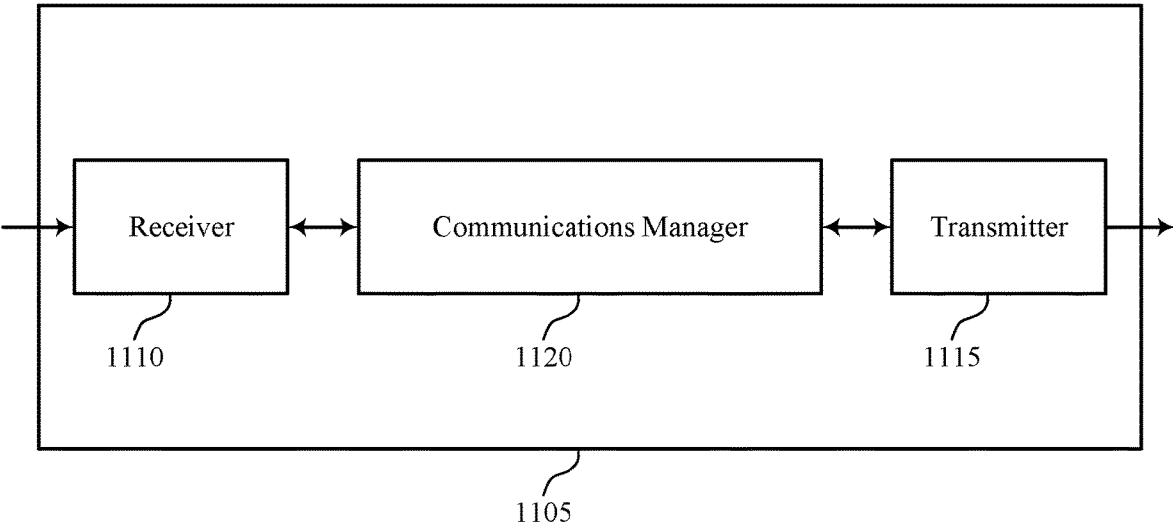
FIGS. 11 and 12 show block diagrams of devices that support modulation based HARQ feedback retransmission design in accordance with one or more aspects of the present disclosure.

FIG. 11 shows a block diagram 1100 of a device 1105 that supports modulation based HARQ feedback retransmission design in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of modulation based HARQ feedback retransmission design as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software) executed by a processor. If implemented in code executed by a processor, the functions of the communications manager 1120, the receiver 1110, the transmitter 1115, or various combinations or components thereof may be performed by a general-purpose processor, a DSP, a CPU, a GPU an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at wireless device in accordance with examples as disclosed herein. For example, the communications manager 1120 may be configured as or otherwise support a means for transmitting an initial transmission associated with a data payload, the initial transmission including a set of bits modulated using a first bit ordering scheme, a first bit subset of the set of bits associated with lower transmission reliability than a second bit subset of the set of bits. The communications manager 1120 may be configured as or otherwise support a means for modulating the first bit subset using a second bit ordering scheme that differs from the first bit ordering scheme to generate a modulated bit set, the second bit ordering scheme associated with higher transmission reliability for the first bit subset. The communications manager 1120 may be configured as or otherwise support a means for transmitting a second transmission associated with the data payload including the modulated bit set.

Additionally, or alternatively, the communications manager 1120 may support wireless communication at a wireless device in accordance with examples as disclosed herein. For example, the communications manager 1120 may be configured as or otherwise support a means for receiving an initial transmission associated with a data payload, the initial transmission including a set of bits modulated using a first bit ordering scheme, a first bit subset of the set of bits associated with lower transmission reliability than a second bit subset of the set of bits. The communications manager 1120 may be configured as or otherwise support a means for receiving a second transmission associated with the data payload including a second set of bits modulated using a second bit ordering scheme that differs from the first bit ordering scheme and results in a modulated bit set, the second bit ordering scheme associated with higher transmission reliability for the first bit subset.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for improved memory usage (e.g., buffer memory) as the data bits or feedback bits are transmitted in a manner to improve reliability of retransmissions, thereby reducing possibility of failed or undecodable transmissions. These techniques support higher throughput by more efficiently using a buffer which may be implemented in memory of a device.

Figure 12:
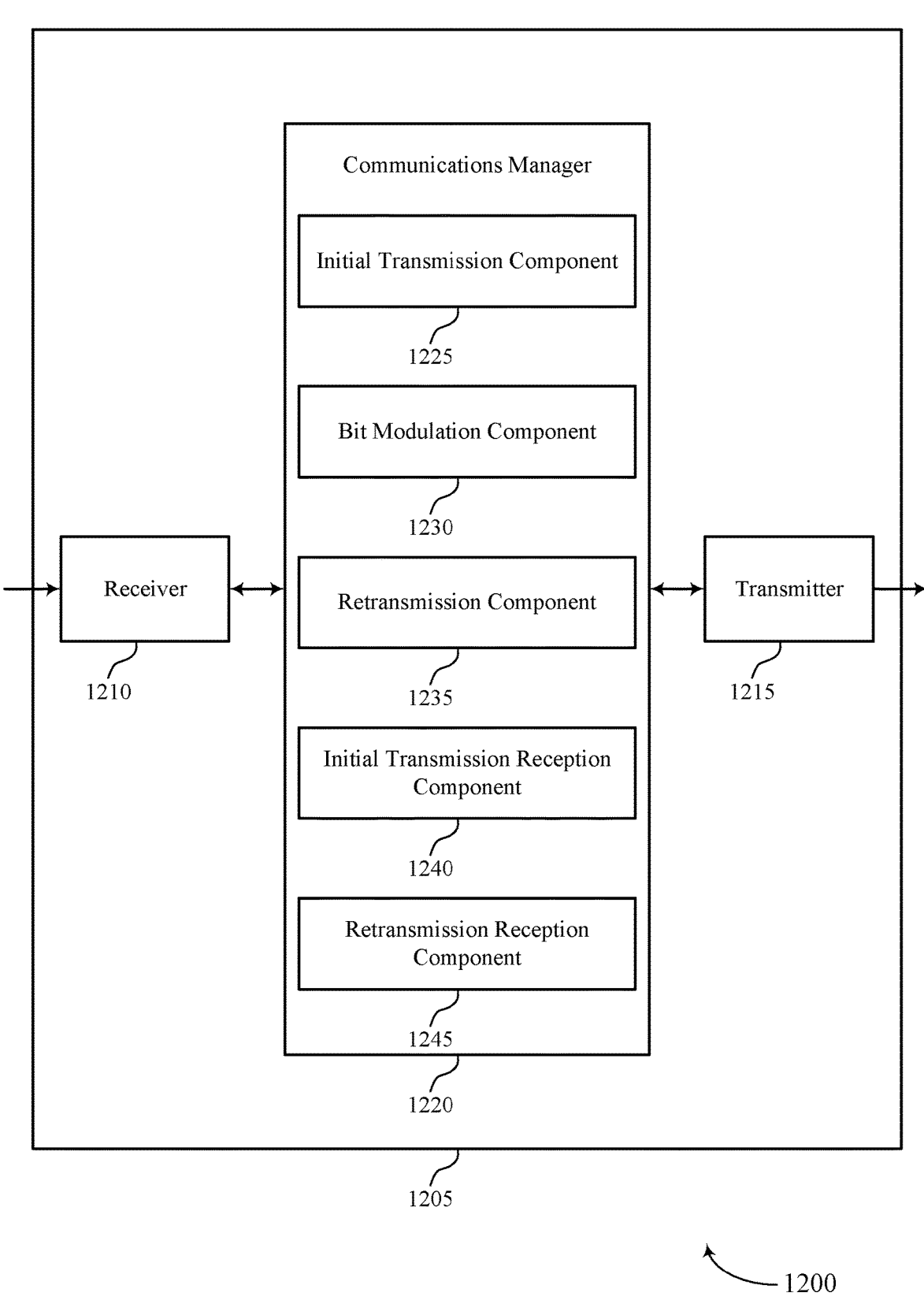

FIG. 12 shows a block diagram 1200 of a device 1205 that supports modulation based HARQ feedback retransmission design in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of modulation based HARQ feedback retransmission design as described herein. For example, the communications manager 1220 may include an initial transmission component 1225, a bit modulation component 1230, a retransmission component 1235, an initial transmission reception component 1240, a retransmission reception component 1245, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at wireless device in accordance with examples as disclosed herein. The initial transmission component 1225 may be configured as or otherwise support a means for transmitting an initial transmission associated with a data payload, the initial transmission including a set of bits modulated using a first bit ordering scheme, a first bit subset of the set of bits associated with lower transmission reliability than a second bit subset of the set of bits. The bit modulation component 1230 may be configured as or otherwise support a means for modulating the first bit subset using a second bit ordering scheme that differs from the first bit ordering scheme to generate a modulated bit set, the second bit ordering scheme associated with higher transmission reliability for the first bit subset. The retransmission component 1235 may be configured as or otherwise support a means for transmitting a second transmission associated with the data payload including the modulated bit set.

Additionally, or alternatively, the communications manager 1220 may support wireless communication at a wireless device in accordance with examples as disclosed herein. The initial transmission reception component 1240 may be configured as or otherwise support a means for receiving an initial transmission associated with a data payload, the initial transmission including a set of bits modulated using a first bit ordering scheme, a first bit subset of the set of bits associated with lower transmission reliability than a second bit subset of the set of bits. The retransmission reception component 1245 may be configured as or otherwise support a means for receiving a second transmission associated with the data payload including a second set of bits modulated using a second bit ordering scheme that differs from the first bit ordering scheme and results in a modulated bit set, the second bit ordering scheme associated with higher transmission reliability for the first bit subset.

Figure 13:
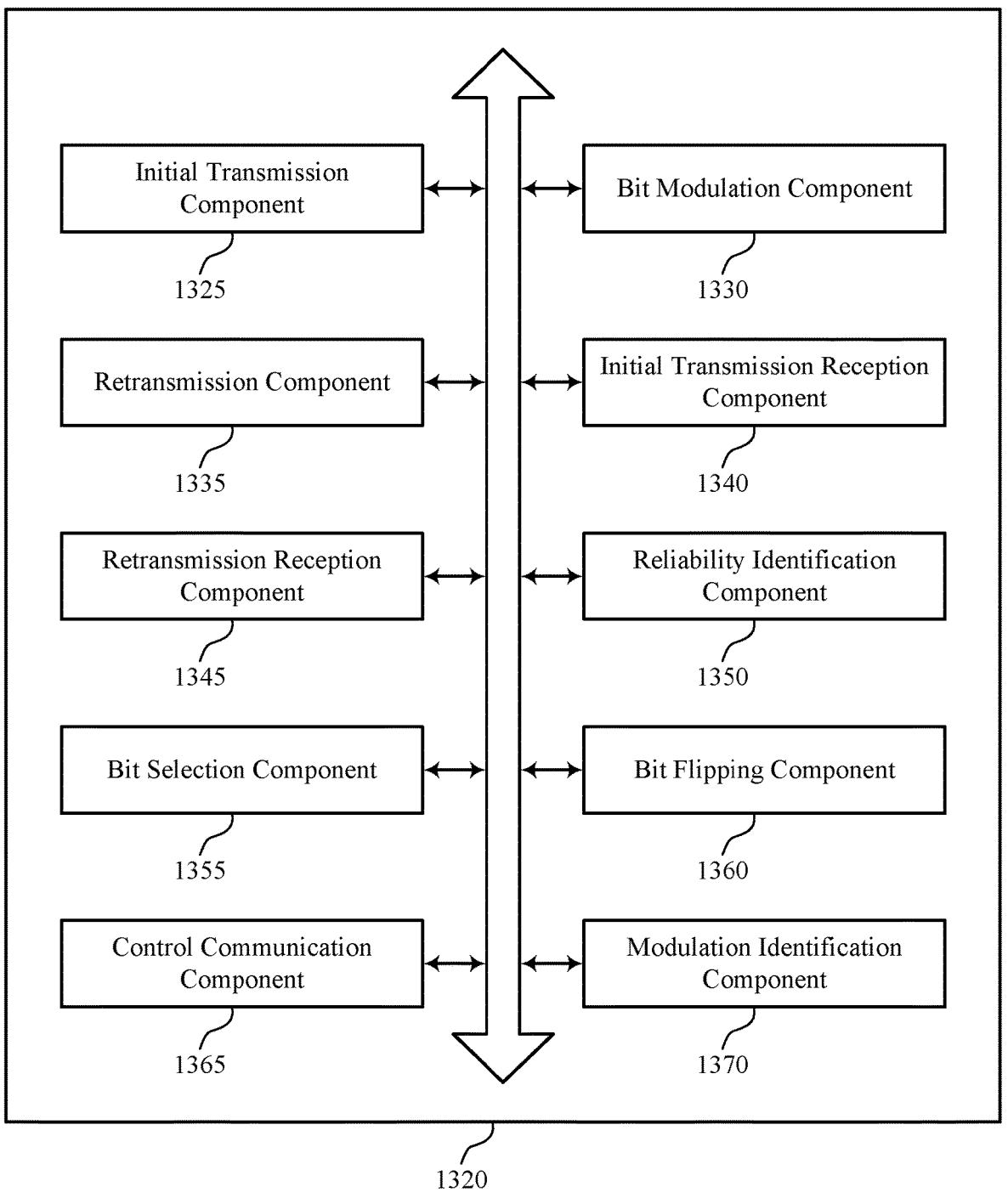
FIG. 13 shows a block diagram of a communications manager that supports modulation based HARQ feedback retransmission design in accordance with one or more aspects of the present disclosure.

FIG. 13 shows a block diagram 1300 of a communications manager 1320 that supports modulation based HARQ feedback retransmission design in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of modulation based HARQ feedback retransmission design as described herein. For example, the communications manager 1320 may include an initial transmission component 1325, a bit modulation component 1330, a retransmission component 1335, an initial transmission reception component 1340, a retransmission reception component 1345, a reliability identification component 1350, a bit selection component 1355, a bit flipping component 1360, a control communication component 1365, a modulation identification component 1370, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at wireless device in accordance with examples as disclosed herein. The initial transmission component 1325 may be configured as or otherwise support a means for transmitting an initial transmission associated with a data payload, the initial transmission including a set of bits modulated using a first bit ordering scheme, a first bit subset of the set of bits associated with lower transmission reliability than a second bit subset of the set of bits. The bit modulation component 1330 may be configured as or otherwise support a means for modulating the first bit subset using a second bit ordering scheme that differs from the first bit ordering scheme to generate a modulated bit set, the second bit ordering scheme associated with higher transmission reliability for the first bit subset. The retransmission component 1335 may be configured as or otherwise support a means for transmitting a second transmission associated with the data payload including the modulated bit set.

In some examples, to support modulating the first bit subset using the second bit ordering scheme, the bit modulation component 1330 may be configured as or otherwise support a means for modulating the first bit subset using the second bit ordering scheme that orders bits of the first bit subset such that a bit of the first bit subset that is transmitted, via the initial transmission, with a lower transmission reliability among bits of the first bit subset is associated with a higher transmission reliability among the bits of the first bit subset for the second transmission.

In some examples, to support modulating the first bit subset using the second bit ordering scheme, the bit modulation component 1330 may be configured as or otherwise support a means for modulating the first bit subset using the second bit ordering scheme that reverses a bit ordering that was used for the initial transmission of the first bit subset.

In some examples, the set of bits of the initial transmission are modulated using a first modulation order. In some examples, the modulated bit set of the second transmission is modulated using a second modulation order, where the second modulation order is a lower modulation order than the first modulation order.

In some examples, to support modulating the first bit subset using the second bit ordering scheme, the reliability identification component 1350 may be configured as or otherwise support a means for determining a conditional entropy corresponding to a modulation order used for modulating the set of bits for the initial transmission. In some examples, to support modulating the first bit subset using the second bit ordering scheme, the bit selection component 1355 may be configured as or otherwise support a means for selecting the first bit subset for the second transmission based on the first bit subset having a higher conditional entropy than the second bit subset. In some examples, to support modulating the first bit subset using the second bit ordering scheme, the bit modulation component 1330 may be configured as or otherwise support a means for modulating the selected first bit subset using the second bit ordering scheme.

In some examples, the bit flipping component 1360 may be configured as or otherwise support a means for flipping a bit value for each bit of a subset of bits of the first bit subset. In some examples, the bit modulation component 1330 may be configured as or otherwise support a means for mapping the first bit subset that includes the flipped bit value to a modulation order to generate the modulated bit set.

In some examples, the set of bits of the initial transmission and the first bit subset of the second transmission are scrambled using a same scrambling identifier.

In some examples, the bit selection component 1355 may be configured as or otherwise support a means for selecting, for inclusion with the second transmission, one or more parity bits from a data buffer associated with the data payload.

In some examples, the second bit ordering scheme prioritizes the one or more parity bits such that the one or more parity bits are associated with a higher transmission reliability than the first bit subset.

In some examples, the second bit ordering scheme reverses an order of bits of the first bit subset.

In some examples, to support selecting the one or more parity bits, the bit selection component 1355 may be configured as or otherwise support a means for selecting the one or more parity bits until a coding rate threshold is satisfied for the second transmission.

In some examples, the set of bits of the initial transmission are modulated using a probabilistic shaping modulation, the first bit subset being associated with lower transmission reliability than a second bit subset of the set of bits based on the probabilistic shaping modulation.

In some examples, the second bit ordering scheme prioritizes the first bit subset based on transmission reliabilities of bit positions for the probabilistic shaping modulation.

In some examples, the control communication component 1365 may be configured as or otherwise support a means for communicating control signaling that indicates the first bit ordering scheme, the second bit ordering scheme, or both.

Additionally, or alternatively, the communications manager 1320 may support wireless communication at a wireless device in accordance with examples as disclosed herein. The initial transmission reception component 1340 may be configured as or otherwise support a means for receiving an initial transmission associated with a data payload, the initial transmission including a set of bits modulated using a first bit ordering scheme, a first bit subset of the set of bits associated with lower transmission reliability than a second bit subset of the set of bits. The retransmission reception component 1345 may be configured as or otherwise support a means for receiving a second transmission associated with the data payload including a second set of bits modulated using a second bit ordering scheme that differs from the first bit ordering scheme and results in a modulated bit set, the second bit ordering scheme associated with higher transmission reliability for the first bit subset.

In some examples, the second bit ordering scheme orders bits of the first bit subset such that a bit of the first bit subset that is received, via the initial transmission, with a lower transmission reliability among bits of the first bit subset is associated with a higher transmission reliability among bits of the first bit subset for the second transmission.

In some examples, the second bit ordering scheme reverses a bit ordering that was used for the initial transmission of the first bit subset.

In some examples, the set of bits of the initial transmission are modulated using a first modulation order. In some examples, the second set of bits of the second transmission is modulated using a second modulation order, where the second modulation order is a lower modulation order than the first modulation order.

In some examples, the first bit subset includes a flipped bit value for each bit of a subset of bits of the first bit subset.

In some examples, the set of bits of the initial transmission and the first bit subset of the second transmission are scrambled using a same scrambling identifier.

In some examples, the second transmission includes one or more parity bits.

In some examples, the second bit ordering scheme prioritizes the one or more parity bits such that the one or more parity bits are associated with a higher transmission reliability than the first bit subset.

In some examples, the second bit ordering scheme reverses an order of bits of the first bit subset.

In some examples, the set of bits of the initial transmission are modulated using a probabilistic shaping modulation, the first bit subset being associated with lower transmission reliability than a second bit subset of the set of bits based on the probabilistic shaping modulation.

In some examples, the second bit ordering scheme prioritizes the first bit subset based on transmission reliabilities of bit positions for the probabilistic shaping modulation.

In some examples, the control communication component 1365 may be configured as or otherwise support a means for communicating control signaling that indicates the first bit ordering scheme, the second bit ordering scheme, or both.

Figure 14:
FIG. 14 shows a diagram of a system including a device that supports modulation based HARQ feedback retransmission design in accordance with one or more aspects of the present disclosure.

FIG. 14 shows a diagram of a system 1400 including a device 1405 that supports modulation based HARQ feedback retransmission design in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting modulation based HARQ feedback retransmission design). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at wireless device in accordance with examples as disclosed herein. For example, the communications manager 1420 may be configured as or otherwise support a means for transmitting an initial transmission associated with a data payload, the initial transmission including a set of bits modulated using a first bit ordering scheme, a first bit subset of the set of bits associated with lower transmission reliability than a second bit subset of the set of bits. The communications manager 1420 may be configured as or otherwise support a means for modulating the first bit subset using a second bit ordering scheme that differs from the first bit ordering scheme to generate a modulated bit set, the second bit ordering scheme associated with higher transmission reliability for the first bit subset. The communications manager 1420 may be configured as or otherwise support a means for transmitting a second transmission associated with the data payload including the modulated bit set.

Additionally, or alternatively, the communications manager 1420 may support wireless communication at a wireless device in accordance with examples as disclosed herein. For example, the communications manager 1420 may be configured as or otherwise support a means for receiving an initial transmission associated with a data payload, the initial transmission including a set of bits modulated using a first bit ordering scheme, a first bit subset of the set of bits associated with lower transmission reliability than a second bit subset of the set of bits. The communications manager 1420 may be configured as or otherwise support a means for receiving a second transmission associated with the data payload including a second set of bits modulated using a second bit ordering scheme that differs from the first bit ordering scheme and results in a modulated bit set, the second bit ordering scheme associated with higher transmission reliability for the first bit subset.

By including or configuring the communications manager 1420 in accordance with examples as described herein, the device 1405 may support techniques for improved memory usage (e.g., buffer memory) as the data bits or feedback bits are transmitted in a manner to improve reliability of retransmissions, thereby reducing possibility of failed or undecodable transmissions. These techniques support higher throughput by more efficiently using a buffer which may be implemented in memory of a device.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of modulation based HARQ feedback retransmission design as described herein, or the processor 1435 and the memory 1425 may be otherwise configured to perform or support such operations.

FIG. 15 shows a flowchart illustrating a method 1500 that supports modulation based HARQ feedback retransmission design in accordance with one or more aspects of the present disclosure. The operations of the method 1500 may be implemented by a UE or a network entity or its components as described herein. For example, the operations of the method 1500 may be performed by a UE 115 as described with reference to FIGS. 1 through 10 or a network entity as described with reference to FIGS. 1 through 6 and 11 through 14. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1505, the method may include transmitting an initial transmission associated with a data payload, the initial transmission comprising a set of bits modulated using a first bit ordering scheme, a first bit subset of the set of bits associated with lower transmission reliability than a second bit subset of the set of bits. The operations of 1505 may be performed in accordance with examples as disclosed herein. In some examples, aspects of the operations of 1505 may be performed by an initial transmission component 925 or an initial transmission component 1325 as described with reference to FIGS. 9 and 13.

At 1510, the method may include modulating the first bit subset using a second bit ordering scheme that differs from the first bit ordering scheme to generate a modulated bit set, the second bit ordering scheme associated with higher transmission reliability for the first bit subset. The operations of 1510 may be performed in accordance with examples as disclosed herein. In some examples, aspects of the operations of 1510 may be performed by a bit modulation component 930 or a bit modulation component 1330 as described with reference to FIGS. 9 and 13.

At 1515, the method may include transmitting a second transmission associated with the data payload comprising the modulated bit set. The operations of 1515 may be performed in accordance with examples as disclosed herein. In some examples, aspects of the operations of 1515 may be performed by a retransmission component 935 or a retransmission component 1335 as described with reference to FIGS. 9 and 13.

At 1520, the method may include modulating the first bit subset using the second bit ordering scheme that orders bits of the first bit subset such that a bit of the first bit subset that is transmitted, via the initial transmission, with a lower transmission reliability among bits of the first bit subset is associated with a higher transmission reliability among the bits of the first bit subset for the second transmission. The operations of 1520 may be performed in accordance with examples as disclosed herein. In some examples, aspects of the operations of 1520 may be performed by a bit modulation component 930 or a bit modulation component 1330 as described with reference to FIGS. 9 and 13.

FIG. 16 shows a flowchart illustrating a method 1600 that supports modulation based HARQ feedback retransmission design in accordance with one or more aspects of the present disclosure. The operations of the method 1600 may be implemented by a UE or a network entity or its components as described herein. For example, the operations of the method 1600 may be performed by a UE 115 as described with reference to FIGS. 1 through 10 or a network entity as described with reference to FIGS. 1 through 6 and 11 through 14. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1605, the method may include transmitting an initial transmission associated with a data payload, the initial transmission comprising a set of bits modulated using a first bit ordering scheme, a first bit subset of the set of bits associated with lower transmission reliability than a second bit subset of the set of bits. The operations of 1605 may be performed in accordance with examples as disclosed herein. In some examples, aspects of the operations of 1605 may be performed by an initial transmission component 925 or an initial transmission component 1325 as described with reference to FIGS. 9 and 13.

At 1610, the method may include modulating the first bit subset using a second bit ordering scheme that differs from the first bit ordering scheme to generate a modulated bit set, the second bit ordering scheme associated with higher transmission reliability for the first bit subset. The operations of 1610 may be performed in accordance with examples as disclosed herein. In some examples, aspects of the operations of 1610 may be performed by a bit modulation component 930 or a bit modulation component 1330 as described with reference to FIGS. 9 and 13.

At 1615, the method may include transmitting a second transmission associated with the data payload comprising the modulated bit set. The operations of 1615 may be performed in accordance with examples as disclosed herein. In some examples, aspects of the operations of 1615 may be performed by a retransmission component 935 or a retransmission component 1335 as described with reference to FIGS. 9 and 13.

At 1620, the method may include selecting, for inclusion with the second transmission, one or more parity bits from a data buffer associated with the data payload. The operations of 1620 may be performed in accordance with examples as disclosed herein. In some examples, aspects of the operations of 1620 may be performed by a bit selection component 955 or a bit selection component 1355 as described with reference to FIGS. 9 and 13.

FIG. 17 shows a flowchart illustrating a method 1700 that supports modulation based HARQ feedback retransmission design in accordance with one or more aspects of the present disclosure. The operations of the method 1700 may be implemented by a UE or a network entity or its components as described herein. For example, the operations of the method 1700 may be performed by a UE 115 as described with reference to FIGS. 1 through 10 or a network entity as described with reference to FIGS. 1 through 6 and 11 through 14. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1705, the method may include receiving an initial transmission associated with a data payload, the initial transmission comprising a set of bits modulated using a first bit ordering scheme, a first bit subset of the set of bits associated with lower transmission reliability than a second bit subset of the set of bits. The operations of 1705 may be performed in accordance with examples as disclosed herein. In some examples, aspects of the operations of 1705 may be performed by an initial transmission reception component 940 or an initial transmission reception component 1340 as described with reference to FIGS. 9 and 13.

At 1710, the method may include receiving a second transmission associated with the data payload comprising a second set of bits modulated using a second bit ordering scheme that differs from the first bit ordering scheme and results in a modulated bit set, the second bit ordering scheme associated with higher transmission reliability for the first bit subset. The operations of 1710 may be performed in accordance with examples as disclosed herein. In some examples, aspects of the operations of 1710 may be performed by a retransmission reception component 945 or a retransmission reception component 1345 as described with reference to FIGS. 9 and 13.

The following provides an overview of aspects of the present disclosure:

Aspect 1: A method for wireless communication at wireless device, comprising: transmitting an initial transmission associated with a data payload, the initial transmission comprising a set of bits modulated using a first bit ordering scheme, a first bit subset of the set of bits associated with lower transmission reliability than a second bit subset of the set of bits; modulating the first bit subset using a second bit ordering scheme that differs from the first bit ordering scheme to generate a modulated bit set, the second bit ordering scheme associated with higher transmission reliability for the first bit subset; and transmitting a second transmission associated with the data payload comprising the modulated bit set.

Aspect 2: The method of aspect 1, wherein modulating the first bit subset using the second bit ordering scheme comprises: modulating the first bit subset using the second bit ordering scheme that orders bits of the first bit subset such that a bit of the first bit subset that is transmitted, via the initial transmission, with a lower transmission reliability among bits of the first bit subset is associated with a higher transmission reliability among the bits of the first bit subset for the second transmission.

Aspect 3: The method of any of aspects 1 through 2, wherein modulating the first bit subset using the second bit ordering scheme comprises: modulating the first bit subset using the second bit ordering scheme that reverses a bit ordering that was used for the initial transmission of the first bit subset.

Aspect 4: The method of any of aspects 1 through 3, wherein the set of bits of the initial transmission are modulated using a first modulation order; and the modulated bit set of the second transmission is modulated using a second modulation order, wherein the second modulation order is a lower modulation order than the first modulation order.

Aspect 5: The method of any of aspects 1 through 4, wherein modulating the first bit subset using the second bit ordering scheme comprises: determining a conditional entropy corresponding to a modulation order used for modulating the set of bits for the initial transmission; selecting the first bit subset for the second transmission based at least in part on the first bit subset having a higher conditional entropy than the second bit subset; and modulating the selected first bit subset using the second bit ordering scheme.

Aspect 6: The method of any of aspects 1 through 5, further comprising: flipping a bit value for each bit of a subset of bits of the first bit subset; and mapping the first bit subset that includes the flipped bit value to a modulation order to generate the modulated bit set.

Aspect 7: The method of aspect 6, wherein the set of bits of the initial transmission and the first bit subset of the second transmission are scrambled using a same scrambling identifier.

Aspect 8: The method of any of aspects 1 through 7, further comprising: selecting, for inclusion with the second transmission, one or more parity bits from a data buffer associated with the data payload.

Aspect 9: The method of aspect 8, wherein the second bit ordering scheme prioritizes the one or more parity bits such that the one or more parity bits are associated with a higher transmission reliability than the first bit subset.

Aspect 10: The method of any of aspects 8 through 9, wherein the second bit ordering scheme reverses an order of bits of the first bit subset.

Aspect 11: The method of any of aspects 8 through 10, wherein selecting the one or more parity bits comprises: selecting the one or more parity bits until a coding rate threshold is satisfied for the second transmission.

Aspect 12: The method of any of aspects 1 through 11, wherein the set of bits of the initial transmission are modulated using a probabilistic shaping modulation, the first bit subset being associated with lower transmission reliability than a second bit subset of the set of bits based at least in part on the probabilistic shaping modulation.

Aspect 13: The method of aspect 12, wherein the second bit ordering scheme prioritizes the first bit subset based at least in part on transmission reliabilities of bit positions for the probabilistic shaping modulation.

Aspect 14: The method of any of aspects 1 through 13, further comprising: communicating control signaling that indicates the first bit ordering scheme, the second bit ordering scheme, or both.

Aspect 15: A method for wireless communication at a wireless device, comprising: receiving an initial transmission associated with a data payload, the initial transmission comprising a set of bits modulated using a first bit ordering scheme, a first bit subset of the set of bits associated with lower transmission reliability than a second bit subset of the set of bits; and receiving a second transmission associated with the data payload comprising a second set of bits modulated using a second bit ordering scheme that differs from the first bit ordering scheme and results in a modulated bit set, the second bit ordering scheme associated with higher transmission reliability for the first bit subset.

Aspect 16: The method of aspect 15, wherein the second bit ordering scheme orders bits of the first bit subset such that a bit of the first bit subset that is received, via the initial transmission, with a lower transmission reliability among bits of the first bit subset is associated with a higher transmission reliability among the bits of the first bit subset for the second transmission.

Aspect 17: The method of any of aspects 15 through 16, wherein the second bit ordering scheme reverses a bit ordering that was used for the initial transmission of the first bit subset.

Aspect 18: The method of any of aspects 15 through 17, wherein the set of bits of the initial transmission are modulated using a first modulation order; and the second set of bits of the second transmission is modulated using a second modulation order, wherein the second modulation order is a lower modulation order than the first modulation order.

Aspect 19: The method of any of aspects 15 through 18, wherein the first bit subset comprises a flipped bit value for each bit of a subset of bits of the first bit subset.

Aspect 20: The method of aspect 19, wherein the set of bits of the initial transmission and the first bit subset of the second transmission are scrambled using a same scrambling identifier.

Aspect 21: The method of any of aspects 15 through 20, wherein the second transmission comprises one or more parity bits.

Aspect 22: The method of aspect 21, wherein the second bit ordering scheme prioritizes the one or more parity bits such that the one or more parity bits are associated with a higher transmission reliability than the first bit subset.

Aspect 23: The method of any of aspects 21 through 22, wherein the second bit ordering scheme reverses an order of bits of the first bit subset.

Aspect 24: The method of any of aspects 15 through 23, wherein the set of bits of the initial transmission are modulated using a probabilistic shaping modulation, the first bit subset being associated with lower transmission reliability than a second bit subset of the set of bits based at least in part on the probabilistic shaping modulation.

Aspect 25: The method of aspect 24, wherein the second bit ordering scheme prioritizes the first bit subset based at least in part on transmission reliabilities of bit positions for the probabilistic shaping modulation.

Aspect 26: The method of any of aspects 15 through 25, further comprising: communicating control signaling that indicates the first bit ordering scheme, the second bit ordering scheme, or both.

Aspect 27: An apparatus for wireless communication at wireless device, comprising a processor; memory coupled with the processor; and instructions stored in the memory and executable by the processor to cause the apparatus to perform a method of any of aspects 1 through 14.

Aspect 28: An apparatus for wireless communication at wireless device, comprising at least one means for performing a method of any of aspects 1 through 14.

Aspect 29: A non-transitory computer-readable medium storing code for wireless communication at wireless device, the code comprising instructions executable by a processor to perform a method of any of aspects 1 through 14.

Aspect 30: An apparatus for wireless communication at a wireless device, comprising a processor; memory coupled with the processor; and instructions stored in the memory and executable by the processor to cause the apparatus to perform a method of any of aspects 15 through 26.

Aspect 31: An apparatus for wireless communication at a wireless device, comprising at least one means for performing a method of any of aspects 15 through 26.

Aspect 32: A non-transitory computer-readable medium storing code for wireless communication at a wireless device, the code comprising instructions executable by a processor to perform a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, etc., whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), and ascertaining. Also, "determining" can include receiving (e.g., receiving information), and accessing (e.g., accessing data stored in memory). Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless device for wireless communications, comprising:
   one or more memories storing processor-executable code; and
   one or more processors coupled with the one or more memories and individually or collectively operable to execute the code to cause the wireless device to:
      transmit an initial transmission associated with a data payload, the initial transmission comprising a set of bits modulated using a first bit ordering scheme, a first bit subset of the set of bits associated with lower transmission reliability than a second bit subset of the set of bits;
      select, for inclusion with a second transmission, one or more parity bits from a data buffer associated with the data payload, wherein at least a portion of the one or more parity bits are not included in the initial transmission and the one or more parity bits are selected until a coding rate threshold is satisfied for the second transmission;
      modulate the first bit subset using a second bit ordering scheme that reverses a bit ordering that was used for the initial transmission of the first bit subset to generate a modulated bit set, the second bit ordering scheme associated with higher transmission reliability for the first bit subset; and
      transmit the second transmission associated with the data payload comprising the modulated bit set and the one or more parity bits.

2. The wireless device of claim 1, wherein, to modulate the first bit subset using the second bit ordering scheme, the one or more processors are individually or collectively operable to execute the code to cause the wireless device to:
   modulate the first bit subset using the second bit ordering scheme that orders bits of the first bit subset such that a bit of the first bit subset that is transmitted, via the initial transmission, with a lower transmission reliability among bits of the first bit subset is associated with a higher transmission reliability among the bits of the first bit subset for the second transmission.

3. The wireless device of claim 1, wherein one or more least significant bits of the first bit ordering scheme are one or more most significant bits of the second bit ordering scheme and one or more most significant bits of the first bit ordering scheme are one or more least significant bits of the second bit ordering scheme.

4. The wireless device of claim 1, wherein:

the set of bits of the initial transmission are modulated using a first modulation order; and the modulated bit set of the second transmission is modulated using a second modulation order, wherein the second modulation order is a lower modulation order than the first modulation order.

5. The wireless device of claim 1, wherein, to modulate the first bit subset using the second bit ordering scheme, the one or more processors are individually or collectively operable to execute the code to cause the wireless device to:

determine a conditional entropy corresponding to a modulation order used for modulating the set of bits for the initial transmission;

select the first bit subset for the second transmission based at least in part on the first bit subset having a higher conditional entropy than the second bit subset; and modulate the selected first bit subset using the second bit ordering scheme.

6. The wireless device of claim 1, wherein the one or more processors are individually or collectively operable to execute the code to cause the wireless device to:

flip a bit value for each bit of a subset of bits of the first bit subset, wherein the flipping occurs before or after the reversing of the bit ordering; and map the first bit subset that includes the flipped bit value to a modulation order to generate the modulated bit set.

7. The wireless device of claim 6, wherein the set of bits of the initial transmission and the first bit subset of the second transmission are scrambled using a same scrambling identifier.

8. The wireless device of claim 1, wherein the second bit ordering scheme prioritizes the one or more parity bits such that the one or more parity bits are associated with a higher transmission reliability than the first bit subset.

9. The wireless device of claim 1, wherein the set of bits of the initial transmission are modulated using a probabilistic shaping modulation, the first bit subset being associated with lower transmission reliability than the second bit subset of the set of bits based at least in part on the probabilistic shaping modulation.

10. The wireless device of claim 9, wherein the second bit ordering scheme prioritizes the first bit subset based at least in part on transmission reliabilities of bit positions for the probabilistic shaping modulation.

11. The wireless device of claim 1, wherein the one or more processors are individually or collectively operable to execute the code to cause the wireless device to:

communicate control signaling that indicates the first bit ordering scheme, the second bit ordering scheme, or both.

12. A wireless device for wireless communications, comprising:

one or more memories storing processor-executable code; and one or more processors coupled with the one or more memories and individually or collectively operable to execute the code to cause the wireless device to:

receive an initial transmission associated with a data payload, the initial transmission comprising a set of bits modulated using a first bit ordering scheme, a first bit subset of the set of bits associated with lower transmission reliability than a second bit subset of the set of bits; and receive a second transmission associated with the data payload comprising a second set of bits and one or more parity bits, the second set of bits modulated using a second bit ordering scheme that differs from the first bit ordering scheme and results in a modulated bit set, wherein at least a portion of the one or more parity bits are not included in the initial transmission and inclusion of the one or more parity bits satisfies a coding rate threshold for the second transmission, the second bit ordering scheme associated with higher transmission reliability for the first bit subset and reverses a bit ordering that was used for the initial transmission of the first bit subset.

13. The wireless device of claim 12, wherein the second bit ordering scheme orders bits of the first bit subset such that a bit of the first bit subset that is received, via the initial transmission, with a lower transmission reliability among bits of the first bit subset is associated with a higher transmission reliability among the bits of the first bit subset for the second transmission.

14. The wireless device of claim 12, wherein one or more least significant bits of the first bit ordering scheme are one or more most significant bits of the second bit ordering scheme and one or more most significant bits of the first bit ordering scheme are one or more least significant bits of the second bit ordering scheme.

15. The wireless device of claim 12, wherein:

the set of bits of the initial transmission are modulated using a first modulation order; and the second set of bits of the second transmission is modulated using a second modulation order, wherein the second modulation order is a lower modulation order than the first modulation order.

16. The wireless device of claim 12, wherein the first bit subset comprises a flipped bit value for each bit of a subset of bits of the first bit subset.

17. The wireless device of claim 16, wherein the set of bits of the initial transmission and the first bit subset of the second transmission are scrambled using a same scrambling identifier.

18. The wireless device of claim 12, wherein the second bit ordering scheme prioritizes the one or more parity bits such that the one or more parity bits are associated with a higher transmission reliability than the first bit subset.

19. The wireless device of claim 12, wherein the set of bits of the initial transmission are modulated using a probabilistic shaping modulation, the first bit subset being associated with lower transmission reliability than the second bit subset of the set of bits based at least in part on the probabilistic shaping modulation.

20. The wireless device of claim 19, wherein the second bit ordering scheme prioritizes the first bit subset based at least in part on transmission reliabilities of bit positions for the probabilistic shaping modulation.

21. The wireless device of claim 12, wherein the one or more processors are individually or collectively operable to execute the code to cause the wireless device to:

communicate control signaling that indicates the first bit ordering scheme, the second bit ordering scheme, or both.

22. A method for wireless communication at wireless device, comprising:

transmitting an initial transmission associated with a data payload, the initial transmission comprising a set of bits modulated using a first bit ordering scheme, a first bit subset of the set of bits associated with lower transmission reliability than a second bit subset of the set of bits;

selecting, for inclusion with a second transmission, one or more parity bits from a data buffer associated with the data payload, wherein at least a portion of the one or more parity bits are not included in the initial transmission and the one or more parity bits are selected until a coding rate threshold is satisfied for the second transmission;

modulating the first bit subset using a second bit ordering scheme that reverses a bit ordering that was used for the initial transmission of the first bit subset to generate a modulated bit set, the second bit ordering scheme associated with higher transmission reliability for the first bit subset; and transmitting a second transmission associated with the data payload comprising the modulated bit set and the one or more parity bits.

23. The method of claim 22, wherein modulating the first bit subset using the second bit ordering scheme comprises:

modulating the first bit subset using the second bit ordering scheme that orders bits of the first bit subset such that a bit of the first bit subset that is transmitted, via the initial transmission, with a lower transmission reliability among bits of the first bit subset is associated with a higher transmission reliability among the bits of the first bit subset for the second transmission.

24. The method of claim 22, wherein one or more least significant bits of the first bit ordering scheme are one or more most significant bits of the second bit ordering scheme and one or more most significant bits of the first bit ordering scheme are one or more least significant bits of the second bit ordering scheme.

25. A method for wireless communication at a wireless device, comprising:

receiving an initial transmission associated with a data payload, the initial transmission comprising a set of bits modulated using a first bit ordering scheme, a first bit subset of the set of bits associated with lower transmission reliability than a second bit subset of the set of bits; and receiving a second transmission associated with the data payload comprising a second set of bits and one or more parity bits, the second set of bits modulated using a second bit ordering scheme that differs from the first bit ordering scheme and results in a modulated bit set, wherein at least a portion of the one or more parity bits are not included in the initial transmission and inclusion of the one or more parity bits satisfies a coding rate threshold for the second transmission, the second bit ordering scheme associated with higher transmission reliability for the first bit subset and reverses a bit ordering that was used for the initial transmission of the first bit subset.

* * * * *